United States Patent
Ju et al.

(10) Patent No.: US 11,910,142 B2
(45) Date of Patent: Feb. 20, 2024

(54) ELECTRONIC DEVICE AND METHOD FOR OPERATING SAME

(71) Applicant: SAMSUNG ELECTRONICS CO., LTD., Suwon-si (KR)

(72) Inventors: Soyoung Ju, Suwon-si (KR); Kilsoo Choi, Suwon-si (KR); Sehyun Kim, Suwon-si (KR); Kwansik Yang, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/703,635

(22) Filed: Mar. 24, 2022

(65) Prior Publication Data

US 2022/0232307 A1   Jul. 21, 2022

Related U.S. Application Data

(63) Continuation of application No. PCT/KR2021/000545, filed on Jan. 14, 2021.

(30) Foreign Application Priority Data

Mar. 24, 2020 (KR) .................. 10-2020-0035807
Jan. 5, 2021  (KR) .................. 10-2021-0001060

(51) Int. Cl.
*G06F 3/16* (2006.01)
*G09G 3/00* (2006.01)
(Continued)

(52) U.S. Cl.
CPC ............. *H04R 1/028* (2013.01); *G06F 3/165* (2013.01); *G09G 3/035* (2020.08); *H04R 3/00* (2013.01); *H04R 2499/15* (2013.01)

(58) Field of Classification Search
CPC . H04R 1/028; H04R 3/00; H04R 3/12; H04R 2499/15; G06F 1/16; G06F 1/1647;
(Continued)

(56) References Cited

U.S. PATENT DOCUMENTS 10,013,955 B2   7/2018   Oh et al.
10,028,080 B2   7/2018   Park et al.
(Continued)

FOREIGN PATENT DOCUMENTS

KR   1020150015246 A   2/2015
KR   1020160123620 A   10/2016
(Continued)

OTHER PUBLICATIONS

International Search Report (PCT/ISA/210) and Written Opinion (PCT/ISA/237) dated Apr. 27, 2021 issued by the International Searching Authority in International Application No. PCT/KR2021/000545.

*Primary Examiner* — Thang V Tran
(74) *Attorney, Agent, or Firm* — Sughrue Mion, PLLC

(57) ABSTRACT

An electronic device and an operating method of the electronic device are provided. The electronic device includes an audio outputter; a rollable display; a communicator configured to receive a tagging input from an external device, when the electronic device is in a low-power mode state, and obtain information about content to be received from the external device according to the tagging input; and a processor configured to control output of the content received from the external device when the processor is woken up by the communicator, wherein the processor is further configured to determine, based on the information about the content, a content output mode indicating a degree to which the rollable display is to be withdrawn, and control at least one of the rollable display or the audio outputter to output (Continued)

the content received from the external device, according to the content output mode.

20 Claims, 14 Drawing Sheets

(51) Int. Cl.
*H04R 3/00* (2006.01)
*H04R 1/02* (2006.01)

(58) Field of Classification Search
CPC . G06F 1/1652; G06F 3/00; G06F 3/14; G06F 3/1454; G06F 3/16; G06F 3/165; G06F 3/0482; G06F 3/04817; G09G 3/00; G09G 3/03; G09G 3/035; G09G 5/14; G09G 5/38; G09G 5/39; G09G 2340/045; G09G 2360/04; G09G 2370/04
See application file for complete search history.

(56) References Cited

U.S. PATENT DOCUMENTS

| | | | |
|---|---|---|---|
| 10,216,398 B2 | 2/2019 | Woo et al. | |
| 10,613,587 B2 | 4/2020 | Hong et al. | |
| 11,019,124 B2 | 5/2021 | Han et al. | |
| 11,114,067 B2* | 9/2021 | Hong | G09G 3/035 |
| 11,164,544 B2* | 11/2021 | Yun | G06F 1/1654 |
| 2015/0024684 A1 | 1/2015 | Tamura et al. | |
| 2020/0186641 A1 | 6/2020 | Ma et al. | |
| 2021/0182008 A1* | 6/2021 | Kim | G06F 3/167 |
| 2023/0026197 A1* | 1/2023 | Choi | G06F 3/048 |
| 2023/0040472 A1* | 2/2023 | Kim | G06F 1/1652 |

FOREIGN PATENT DOCUMENTS

| | | |
|---|---|---|
| KR | 1020170043347 A | 4/2017 |
| KR | 101918040 B1 | 1/2019 |
| KR | 1020190022157 A | 3/2019 |
| KR | 1020190033966 A | 4/2019 |

* cited by examiner

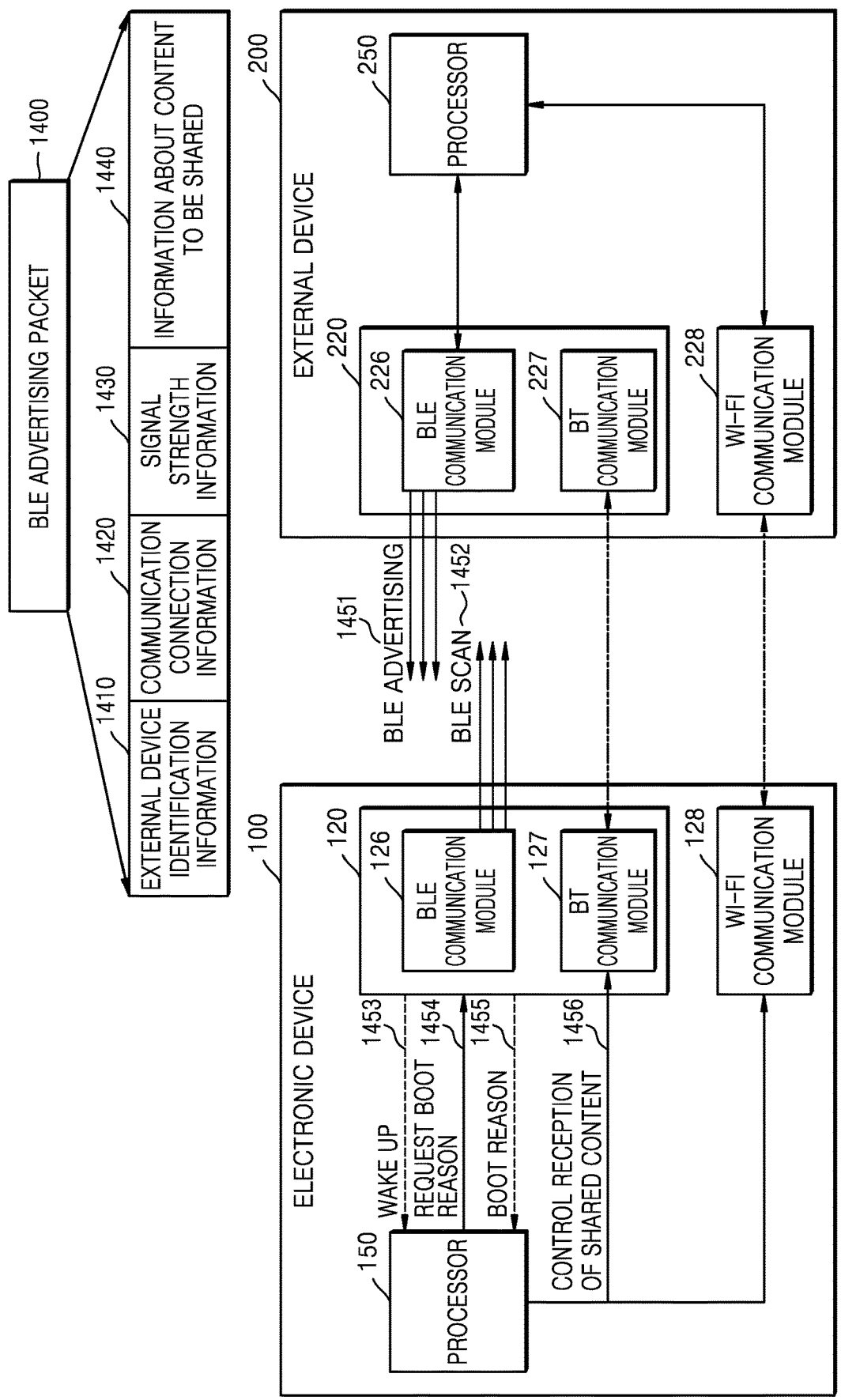

ELECTRONIC DEVICE AND METHOD FOR OPERATING SAME

CROSS-REFERENCE TO RELATED APPLICATIONS

This application is a Continuation Application of International Application PCT/KR2021/000545 filed on Jan. 14, 2021, which is based on and claims priority to Korean Patent Application No. 10-2020-0035807, filed on Mar. 24, 2020, and Korean Patent Application No. 10-2021-0001060, filed on Jan. 5, 2021, in the Korean Intellectual Property Office, the disclosures of which are incorporated by reference herein in their entireties.

BACKGROUND

1. Field

The disclosure to an electronic device and an operating method thereof, and more particularly, to an electronic device for outputting, from the electronic device, content output from an external device based on a tagging input from the external device, and an operating method thereof.

2. Description of Related Art

Bendable display devices called rollable displays or flexible displays are attracting attention. The rollable displays or flexible displays have flexibility that enables the display devices to be bendable by replacing glass substrates, which are used in existing display panels, with plastic films. In a display device employing a rollable display, the rollable display may be rolled into a housing module of the display device when a user does not view the display device and may be withdrawn and/or unfolded from the housing module when the user attempts to view the display device. As such, a display device utilizing a rollable display and/or a flexible display may have an advantage in space utilization when compared to a display device using a display panel with a glass substrate.

Content mirroring technology or content streaming technology is a technology that allows content output from one device to be transmitted to another device between two devices having an audio and/or video output function so that the content may be output equally from the two devices. The content mirroring technology may be commonly used to output content displayed on a terminal having a relatively small screen, such as a portable terminal, onto a larger screen. For example, a user may desire to mirror content displayed on a portable terminal onto an electronic device such as a television.

Content mirroring may include sound mirroring to share audio content with the screen mirroring to share audio/video content. Sound mirroring may refer to the sharing of audio content output from one electronic device to another electronic device. Screen mirroring may refer to the sharing of audio/video content output from one electronic device to another electronic device. For example, in the case of sound mirroring, because only the sharing of audio content is required, there is no need to operate a video outputter in an electronic device that receives audio content. In particular, in a rollable display device in which a rollable display is inserted into a housing module in a low-power mode state, the rollable display may take several (e.g., tens) of seconds until the rollable display is withdrawn and fully unfolded. That is, operating the rollable display for sound mirroring may be inefficient in terms of time spent withdrawing the rollable display and/or in terms of power consumed to withdraw the rollable display.

SUMMARY

Provided are an electronic device and an operating method thereof, which, when the electronic device is in a low-power mode state and a rollable display is inserted into a housing module , allows content output from an external device to be automatically shared with the electronic device without a separate user manipulation according to a tagging input using the external device.

Also provided are an electronic device and an operating method thereof, which allow the electronic device to control a rollable display or an audio outputter of the electronic device without separate user manipulation according to a type of content to be shared from an external device through a tagging input from the external device.

According to an aspect of the disclosure, there is provided an electronic device including: an audio outputter; a rollable display; a communicator configured to receive a tagging input from an external device, when the electronic device is in a low-power mode state, and obtain information about content to be received from the external device according to the tagging input; and a processor configured to control output of the content received from the external device when the processor is woken up by the communicator, wherein the processor is further configured to determine, based on the information about the content, a content output mode indicating a degree to which the rollable display is to be withdrawn, and control at least one of the rollable display or the audio outputter to output the content received from the external device, according to the content output mode.

The information about the content may include at least one of content identification information or identification information of an application used to execute the content, and the processor may be further configured to determine the content output mode based on the at least one of the content identification information or the identification information of the application.

The processor may be further configured to identify, based on the information about the content, a type of the content as one of audio content, audio content including audio information, or audio/video content, and determine the content output mode based on the identified type of the content.

The processor may be further configured to: based on the identified type of the content being the audio content, determine the content output mode as a closed mode in which the audio content is output without controlling the rollable display to be withdrawn, and based on determining the content output mode as the closed mode, control the audio outputter to output the audio content received from the external device without controlling the rollable display to be withdrawn.

The processor may be further configured to, based on the identified type of the content being the audio content including the audio information, determine the content output mode as a partial withdrawal mode in which the audio content is output in a state in which the rollable display is partially withdrawn, and based on determining the content output mode as the partial withdrawal mode control the rollable display to be partially withdrawn, control the rollable display to output the audio information on the partially withdrawn rollable display, and control the audio outputter to output the received audio content.

The processor may be further configured to, based on the identified type of the content being the audio/video content, determine the content output mode as a full withdrawal mode in which the audio/video content is output in a state in which the rollable display is fully withdrawn, and based on determining of the content output mode as the full withdrawal mode, control the rollable display to be fully withdrawn and output video content among the audio/video content received from the external device, and control the audio outputter to output the audio content among the audio/video content.

The processor may be further configured to control the rollable display so that a first aspect ratio of the withdrawn rollable display corresponds to a second aspect ratio of the video content.

The communicator may be further configured to, based on receiving the tagging input, wake up the processor, and provide, to the processor that is woken up, a boot reason including the information about the content.

The communicator may be further configured to receive the tagging input from the external device through at least one of a near field communication (NFC) communication module or a Bluetooth Low Energy (BLE) communication module.

The communicator may include a near field communication (NFC) communication module configured to: obtain, through the tagging input received from the external device, identification information of the external device and the information about the content to be received from the external device, wake up the processor according to the tagging input, and provide, to the processor that is woken up, the identification information of the external device and the information about the content.

The communicator may include a plurality of near field communication (NFC) communication modules, an NFC communication module, among the plurality of NFC communication modules, that has received the tagging input from the external device, is configured to obtain, through the tagging input received from the external device, identification information of the external device and the information about the content to be received from the external device, and wake up the processor according to the tagging input, and provide, to the processor that is woken up, the identification information of the external device and the information about the content, and the processor may be further configured to identify a type of the content to be received from the external device by identifying the NFC communication module, among the plurality of NFC communication modules, that has woken up the processor.

The communicator may include a Bluetooth Low Energy (BLE) communication module is configured to: receive the tagging input based on a signal strength of a signal received from the external device, obtain, through the tagging input, identification information of the external device and the information about the content to be received from the external device, wake up the processor according to the tagging input, and provide, to the processor that is woken up, the identification information of the external device and the information about the content.

The communicator may include a Bluetooth Low Energy (BLE) communication module is configured to: receive the tagging input based on an acceleration sensor value of the external device, obtain, through the tagging input, identification information of the external device and the information about the content to be received from the external device, wake up the processor according to the tagging input, and provide, to the processor that is woken up, the identification information of the external device and the information about the content.

The processor may be further configured to, based on the identified type of the content being the audio content, control the communicator to receive the audio content through Bluetooth communication, and based on the identified type of the content being the audio/video content, control the communicator to receive the audio/video content through Wireless Fidelity (Wi-Fi) communication.

According to an aspect of the disclosure, there is provided a method of operating an electronic device including a rollable display, an audio outputter, a communicator, and a processor, the method including: receiving, by the communicator, a tagging input from an external device, in a low-power mode state of the electronic device; obtaining information about content to be received from the external device according to the tagging input; determining, by the processor woken up by the communicator, a content output mode indicating a degree to which the rollable display is to be withdrawn according to the information about the content obtained from the communicator; and outputting the content received from the external device through at least one of the rollable display or the audio outputter, according to the content output mode.

According to various embodiments of the present disclosure, when an electronic device is in a low-power state, a user may share content output from an external device with the electronic device so that the content can be output through the electronic device, by an operation of tagging the external device with the electronic device.

According to various embodiments of the present disclosure, a rollable display and an audio outputter of an electronic device may be adaptively controlled according to a type of content output of an external device by an operation of tagging the external device with the electronic device without separate user manipulation.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 illustrates an example of a content sharing system according to

FIG. 14 is a reference diagram for describing an example of processing a tagging input using wireless tagging in an electronic device, according to an embodiment.

DETAILED DESCRIPTION

Figure 1:
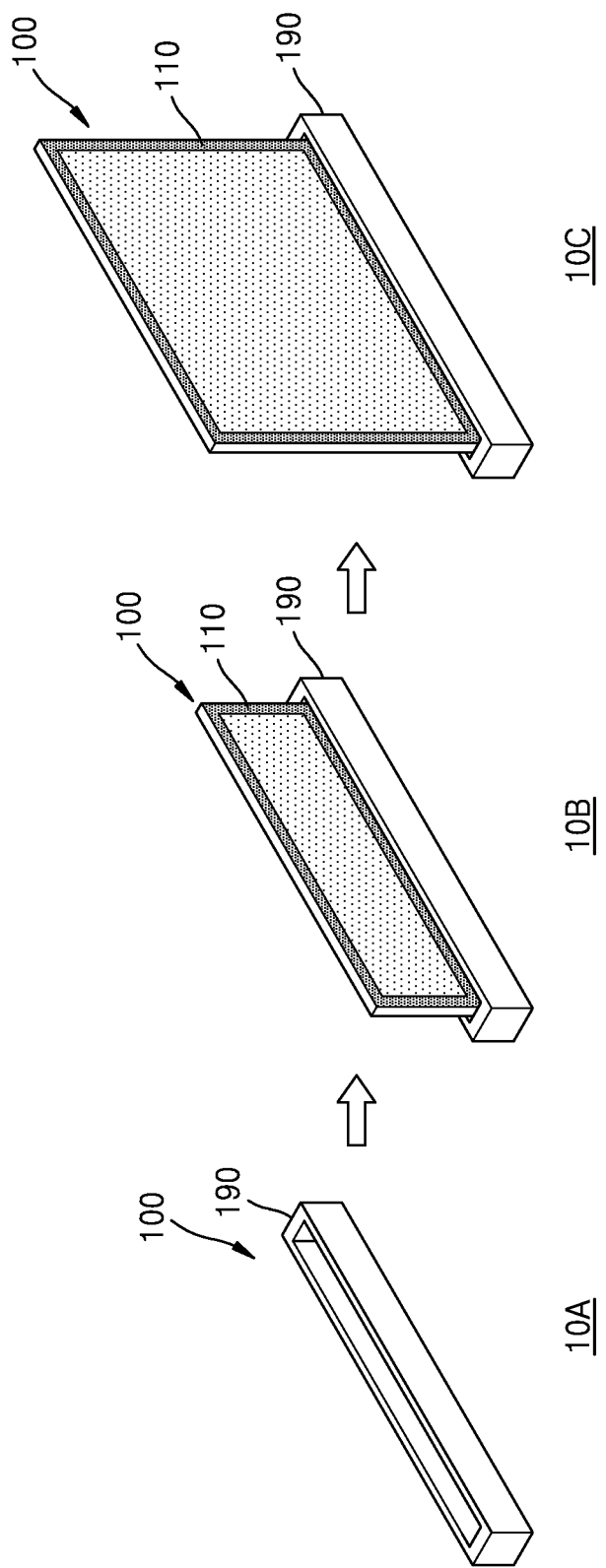
FIG. 1 illustrates an example of an electronic device including a rollable display, according to an embodiment.

Hereinafter, the terms used in the specification will be briefly described, and then the disclosure will be described in detail.

The terms used in the disclosure are those general terms currently widely used in the art in consideration of functions in regard to the disclosure, but the terms may vary according to the intention of those of ordinary skill in the art, precedents, or new technology in the art. Alternatively or additionally, specified terms may be selected by the applicant, and in this case, the detailed meaning thereof will be described in the detailed description of the disclosure. Thus, the terms used in the disclosure should be understood not as simple names but based on the meaning of the terms and the overall description of the disclosure.

Throughout the specification, when a portion "includes" an element, another element may be further included, rather than excluding the existence of the other element, unless otherwise described. In addition, terms such as " . . . unit", " . . . module", or the like refer to units that perform at least one function or operation, and the units may be implemented as hardware or software or as a combination of hardware and software.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment", "in an embodiment," and similar language throughout this specification may, but do not necessarily, all refer to the same embodiment. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

Hereinafter, the disclosure will now be described more fully with reference to the accompanying drawings, in which embodiments of the disclosure are shown such that one of ordinary skill in the art may easily work the disclosure. This disclosure may, however, be embodied in many different forms and should not be construed as limited to the embodiments of the disclosure set forth herein. Alternatively or additionally, elements not related to description are omitted in the drawings for clear description of the disclosure, and like reference numerals in the drawings denote like elements throughout the specification.

In embodiments of the specification, the term "user" refers to a person who controls functions or operations of a computing device or an electronic device using a control device, and may include a viewer, a manager, or an installer.

FIG. 1 illustrates an example of an electronic device 100 including a rollable display 110, according to an embodiment.

Referring to FIG. 1, according to an embodiment, the electronic device 100 may include the rollable display 110 that may be wound and/or unwound and a housing module 190 in which the wound rollable display 110 may be seated. In a standby mode and/or low-power mode state of the electronic device 100, the rollable display 110 may be wound and seated in the housing module 190, and when a power-on input is received in the electronic device 100, the rollable display 110 may be unwound and withdrawn from the housing module 190. The electronic device 100 may be further configured to output content through the rollable display 110, when the rollable display 110 is fully withdrawn and an entire display area of the rollable display 110 is displayed outside the housing module 190.

The rollable display 110 may be a flat display panel using a flexible substrate. For example, the rollable display 110 may be a flexible organic light-emitting display panel, a flexible light-emitting diode display panel, or a flexible electrophoretic display panel. The flexible substrate may be a plastic substrate or a flexible glass substrate. For example, the plastic substrate may include any one of polyimide (PI), polyethylene terephthalate (PET), polycarbonate (PC), polyethylenapthanate (PEN), polynorbornene (PNB), polyethersulfone (PES), and cyclic olefin polymer (COP).

The rollable display 110 may be wound by a roller included in the housing module 190 and inserted into the housing module 190. Alternatively or additionally, the rollable display 110 may be unwound by the roller and withdrawn from the housing module 190.

The housing module 190 may include a housing frame and a housing cover for seating the rollable display 110. The housing frame may be formed to have an inner space to support the roller, and the housing cover may include a panel inlet/outlet through which the rollable display 110 may enter and exit. The roller is provided in the housing module 190 to wind or unwind the rollable display 110. The rollable display 110 may be withdrawn from the housing module 190 according to an unwinding operation and may be vertically erected.

It may usually take several seconds to several tens of seconds until the rollable display 110 seated in the housing module 190 (e.g., 10A) is unwound and withdrawn from the housing module 190 to be vertically erected (e.g., 10C).

A degree to which the rollable display 110 is withdrawn and unfolded from the housing module 190 may be variously determined. For example, when the electronic device 100 outputs only audio content, the rollable display 110 may not be withdrawn (e.g., 10A). For example, when the electronic device 100 outputs only audio information without outputting video content, the rollable display 110 may be withdrawn to a size (and/or a position) capable of outputting the audio information (e.g., 10B). For example, when the electronic device 100 outputs video content, the rollable display 110 may be fully withdrawn (e.g., 10C). Alternatively or additionally, a degree (and/or amount) of withdrawal of the rollable display 110 may vary according to an aspect ratio of the video content. For example, when the aspect ratio of the video content is a first aspect ratio (e.g., 16:9), the rollable display 110 may be withdrawn to a first size (and/or first position) capable of providing (e.g., displaying) the first aspect ratio. For another example, when the aspect ratio of the video content is a second aspect ratio (e.g., 21:9), the rollable display 110 may be withdrawn to a second size (and/or second position) capable of providing (e.g., displaying) the second aspect ratio.

Figure 2:
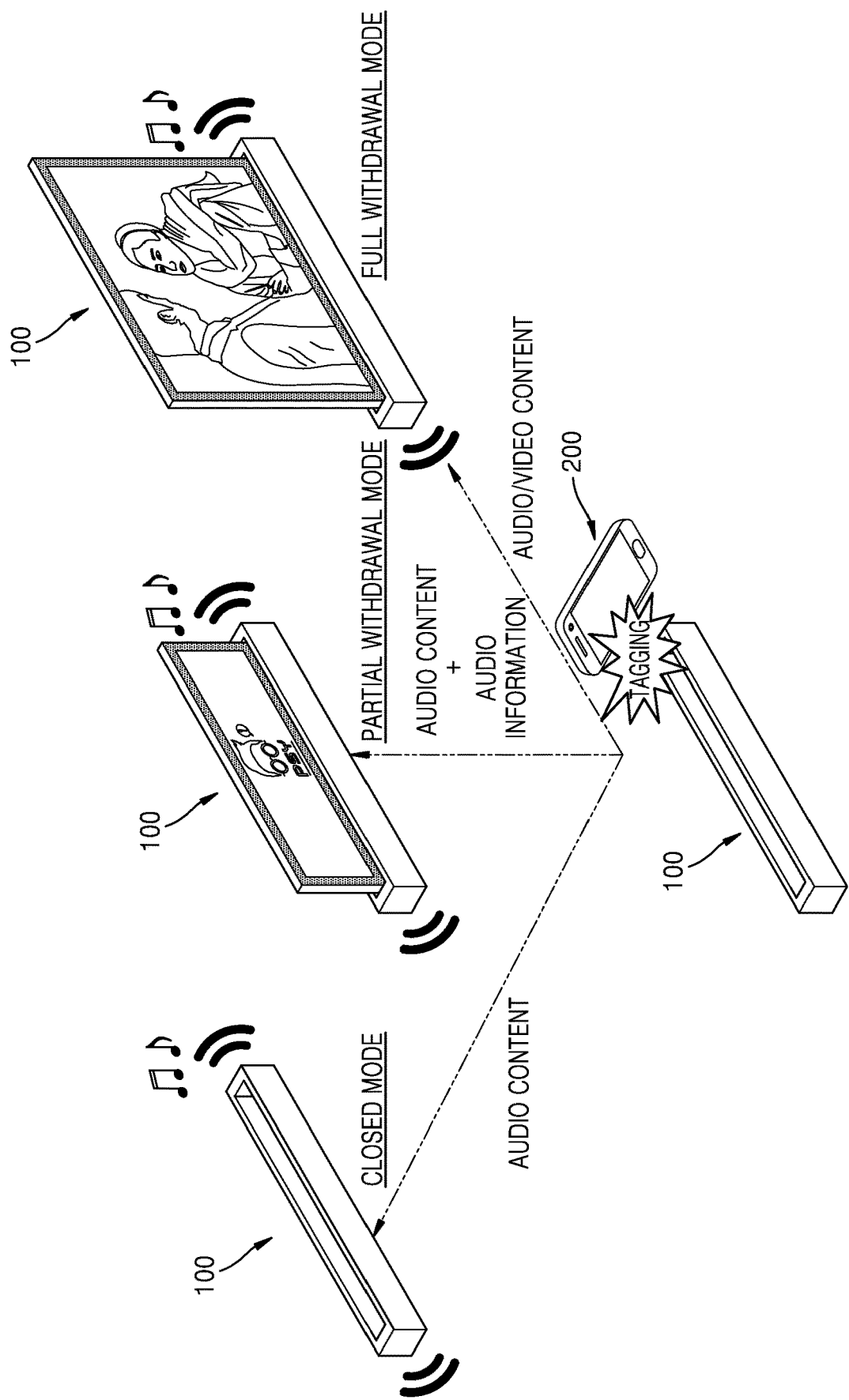
FIG. 2 is a reference diagram for describing an operating method of an electronic device for sharing content, according to various embodiments.

FIG. 2 is a reference diagram for describing an operating method of an electronic device 100 for sharing content, according to various embodiments.

Referring to FIG. 2, an external device 200 may include a processor, a memory, a display, a speaker, or the like to output audio and/or video content according to a request of a user.

The external device 200 may include a cellular telephone, a smartphone, a watch, a wrist display, a personal or mobile multimedia player, a personal data assistant (PDA), a tablet computer, a laptop computer, a netbook, an ultra-book, a palmtop computer, a wireless electronic mail receiver, a multimedia Internet enabled cellular telephone, a wireless gaming controller, and other similar personal electronic devices including programmable processors and circuitry for wirelessly transmitting and receiving information. The external device 200 may be referred to as an electronic device, a computing device, a user terminal device, or the like, but will be mainly referred to as an external device in the present disclosure to be distinguished from the electronic device 100. The external device 200 is described in further detail in reference to FIG. 3.

The external device 200 may transmit audio and/or video content output from the external device 200 to the electronic device 100 using various content sharing technologies, and the electronic device 100 may output the received audio and/or video content. For example, while the external device 200 outputs audio content such as music or the like, when the external device 200 transmits the output audio content to the electronic device 100 using the content sharing technology, the electronic device 100 may output the audio content shared by the external device 200. For another example, while the external device 200 outputs audio/video content such as a movie or the like, when the external device 200 transmits the output audio/video content to the electronic device 100 using the content sharing technology, the electronic device 100 may output the audio/video content shared by the external device 200.

Various content sharing technologies include a method of directly transmitting screen content displayed on a display of the external device 200 to the electronic device 100 and displaying the screen content on the display of the electronic device 100. For example, the various content sharing technologies may include a method that includes a uniform resource locator (URL) of content being executed in the external device 200 being transmitted to the electronic device 100, the electronic device 100 directly receiving the content from a server using the received URL of the content, and the electronic device 100 displaying the received content. For example, various content sharing technologies may be referred to as content mirroring technologies or content streaming technologies. Examples of commercially available content sharing technology include Miracast®, Chromecast®, or the like.

Content shared via various content sharing technologies may include video content including still images such as photos, audio content such as music, audio/video content such as movies, and audio content including audio information (e.g., cover art, lyrics, artist, etc.).

According to an embodiment, the electronic device 100 may receive a tagging input from the external device 200. Alternatively or additionally, the electronic device 100 may receive, using the content sharing technology, audio content and/or video content output from the external device 200 according to the received tagging input, and may output the received audio content and/or video content.

According to an embodiment, the electronic device 100 may obtain information about content to be shared according to the tagging input received from the external device 200, and may determine a content output mode of the content to be output by the electronic device 100 based on the information about the content. The content output mode may indicate a method for receiving, by the electronic device 100, content from the external device 200 and outputting the received content. For example, the content output mode may include a closed mode in which audio content is output through the audio outputter 130 without controlling the rollable display 110 to be withdrawn, a partial withdrawal mode in which audio information is output by controlling the rollable display 110 to be partially withdrawn and audio content is output through the audio outputter 130, and a full withdrawal mode in which video content is output by controlling the rollable display 110 to be fully withdrawn and audio content is output through the audio outputter 130.

According to an embodiment, the electronic device 100 may operate in the closed mode when the content shared by the external device 200 is audio content. As shown in FIG. 2, while in the closed mode, the electronic device 100 may output the audio content shared by the external device 200 through the audio outputter 130 without withdrawing the rollable display 110 (e.g., the rollable display 110 may remain inside the housing module 190 of the electronic device 100). For example, when the user enjoys audio content such as music using the external device 200 and performs a tagging input operation on the electronic device 100 using the external device 200, the electronic device 100 may identify that the content shared by the external device 200 is the audio content through the tagging input operation. Alternatively or additionally, in response to the identifying that the shared content is the audio content, the electronic device 100 may determine that the rollable display 110 is not required to output the shared content, and thus, the electronic device 100 may output the shared audio content through the audio outputter 130 without controlling the rollable display 110 to be withdrawn. Because controlling the rollable display 110 to be withdrawn usually takes several seconds to several tens of seconds, the electronic device 100 may prevent the rollable display 110 from being unnecessarily withdrawn and more quickly share the audio content by checking in advance whether the content to be shared is audio content that is not required to be displayed and preventing the rollable display 110 from being withdrawn.

According to an embodiment, the electronic device 100 may operate in the partial withdrawal mode when the content shared by the external device 200 is audio content including audio information. As shown in FIG. 2, while in the partial withdrawal mode, the electronic device 100 may output (e.g., display or present) the audio information by withdrawing the rollable display 110 to a size (and/or position) required to display the audio information and may output the audio content through the audio outputter 130. For example, when the user enjoys audio content including audio information, such as music, using the external device 200 and performs a tagging input operation on the electronic device 100 using the external device 200, the electronic device 100 may identify that the content shared by the external device 200 is the audio content including audio information through the tagging input operation., when the electronic device 100 determines that the shared audio content includes audio information (e.g., metadata information such as a song title, lyrics, a singer, an album cover image, or the like), the electronic device 100 may control the rollable display 110 to be withdrawn to a degree (e.g., size and/or position) at which the audio information may be displayed. Accordingly, the electronic device 100 may output the audio information to be displayed by controlling the rollable display 110 to be withdrawn to the size (and/or position) required to display the audio information and may output the audio content through the audio outputter 130.

According to an embodiment, the electronic device 100 may operate in the full withdrawal mode when the content shared by the external device 200 is audio/video content. As shown in FIG. 2, while in the full withdrawal mode, the electronic device 100 may control the rollable display 110 to be withdrawn to a degree (e.g., size and/or position) required to output the video content and may output the audio content through the audio outputter 130. For example, when the user enjoys audio/video content, such as a movie, using the external device 200 and performs a tagging input operation on the electronic device 100 using the external device 200, the electronic device 100 may identify that the content shared by the external device 200 is the audio/video content through the tagging input operation. Accordingly, the electronic device 100 may control the rollable display 110 to be fully withdrawn, display video content through the fully withdrawn rollable display 110, and output audio content through the audio outputter 130.

According to an embodiment, the electronic device 100 may identify a content type, such as whether the content to be shared from the external device 200 is audio content, audio/video content, or audio content including audio information, through content identification information or information about an application used to execute and/or reproduce the content. For example, the electronic device 100 may obtain the content identification information or the information about the application used to execute the content from a tagging input from the external device 200.

According to an embodiment, when the electronic device 100 receives the tagging input from the external device 200 when the electronic device 100 is in a standby mode or a low-power mode, the electronic device 100 may be woken up by the tagging input to receive the audio content and/or the video content output by the external device 200 using the content sharing technology and to output the received audio content and/or video content. For example, the electronic device 100 may include a communication module that operates in the standby mode or low-power mode state of the electronic device 100. For example, the communication module may continue to be supplied power when the electronic device 100 operates in the standby mode or the low-power mode. When the tagging input is detected by the communication module, the communication module may perform an operation of waking up a controller (e.g., processor) of the electronic device 100, and thus may cause the electronic device 100 to transition from the standby mode or low-power mode state to a normal mode. Alternatively or additionally, the controller of the electronic device 100 may control some components of the electronic device 100, which are required to output the content to be shared from the external device 200, to be supplied with power, and may control other components, which are not required to output the content to be shared, to be maintained in a state in which power is not supplied. For example, when the content to be shared from the external device 200 is audio content, and an operation of the rollable display 110 is not necessary, the controller of the electronic device 100 may control the rollable display 110 to maintain a state in which power is not supplied.

According to an embodiment, the electronic device 100 may detect the tagging input from the external device 200 using various communication modules and sensors. According to an embodiment, the electronic device 100 may detect the tagging input from the external device 200 through a near field communication (NFC) communication module.

According to an embodiment, the electronic device 100 may detect the tagging input from the external device 200 through a plurality of NFC communication modules.

According to an embodiment, the electronic device 100 may detect the tagging input from the external device 200 through a Bluetooth Low Energy (BLE) communication module. According to an embodiment, the electronic device 100 may detect the tagging input from the external device 200 using the BLE communication module and an acceleration sensor.

Figure 3:
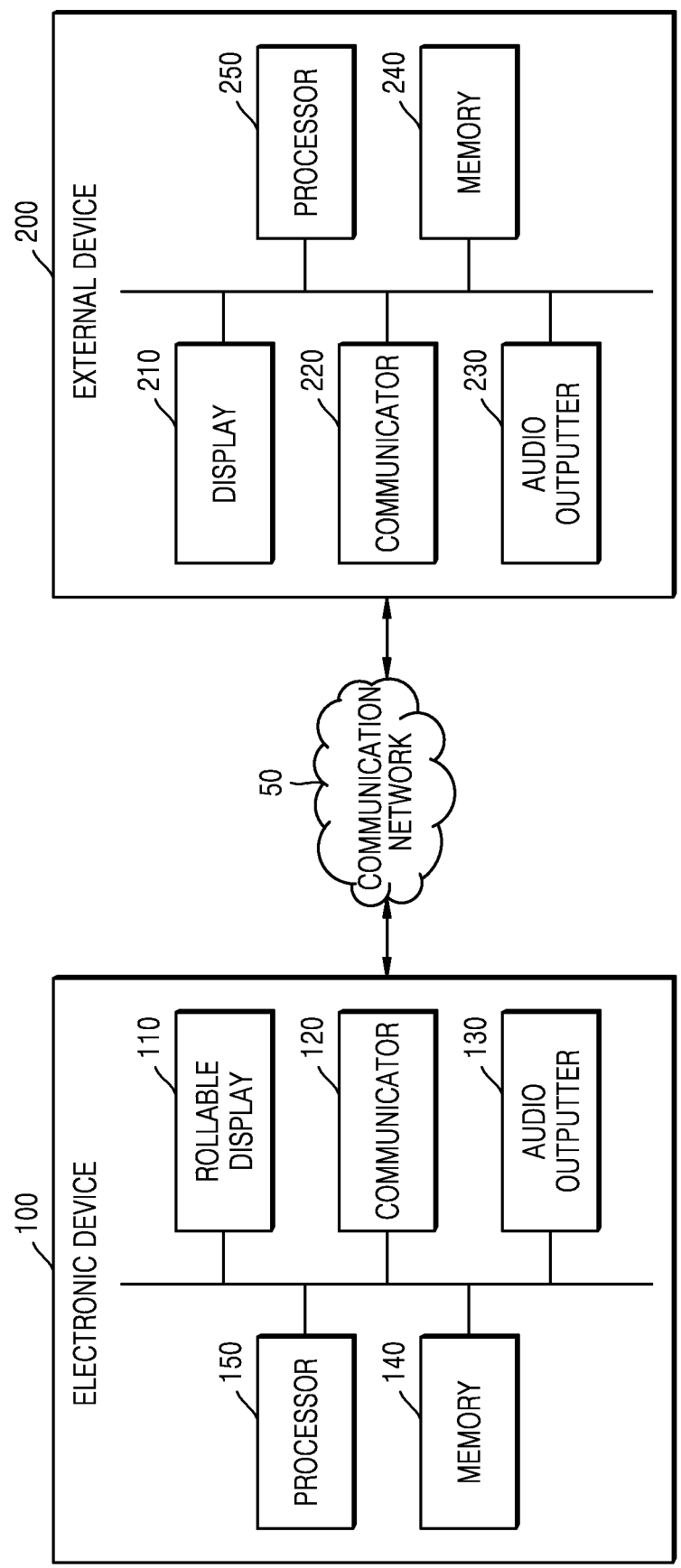

FIG. 3 illustrates an example of a content sharing system according to an embodiment.

Referring to FIG. 3, a content sharing system according to an embodiment may include the electronic device 100 including the rollable display 110 and capable of winding and/or unwinding the rollable display 110, the external device 200 communicating with the electronic device 100 for content sharing, and a communication network 50 for communication between the electronic device 100 and the external device 200. In the content sharing system according to an embodiment, the external device 200 may be referred to as a source device in the sense of providing content to be shared, and/or may be referred to as a sink device in the sense of receiving content to be shared.

According to an embodiment, the electronic device 100 may include the rollable display 110, a communicator (communication interface) 120, an audio outputter (audio output device) 130, a memory 140, and a processor 150. The processor 150 may be generally referred to as a controller. In various embodiments, the electronic device 100 may be referred to as a computing device or a display device, and may further include elements in addition to the elements illustrated in FIG. 3, or some elements may be omitted.

According to an embodiment, the rollable display 110 may display an image or video processed by the processor 150 and/or an execution screen of an application. The rollable display 110 may be wound by a roller included in the housing module 190, which is illustrated in FIG. 1, and inserted into the housing module 190, or may be unwound by the roller and withdrawn from the housing module 190. For example, in the standby mode state of the electronic device 100, the rollable display 110 may be wound and seated in the housing module 190, and the rollable display 110 may be unwound and withdrawn from the housing module 190 to be erected according to a power-on input or the like.

According to an embodiment, the rollable display 110 may display audio information received from the external device 200 for content sharing by not being withdrawn or being partially withdrawn from the housing module 190 under control from the processor 150. Alternatively or additionally, the rollable display 110 may display video content received from the external device 200 for content sharing by being fully withdrawn.

The communicator 120, according to an embodiment, may establish wired communication and/or wireless communication according to a protocol using at least one external device 200. The communicator 120, according to an embodiment, may include one or more modules that enable wireless communication between the electronic device 100 and a wireless communication system and/or between the electronic device 100 and a network (e.g., communication network 50 and/or internet) in which another electronic device (e.g., external device 200, a server) is located.

According to an embodiment, the communicator 120 may include one or more communication modules configured to receive a tagging input for content sharing from the external device 200. For example, the one or more communication modules for receiving the tagging input may include, but are not limited to, an NFC communication module or a Bluetooth (BT) communication module. The one or more communication modules for receiving the tagging input may detect the tagging input from the external device 200 by being supplied power even when the electronic device 100 is in the standby mode or the low-power mode. The one or more communication modules that have detected the tagging input may wake up the processor 150 from a sleep (e.g., standby, low-power) state and may provide, to the woken-up processor 150, identification information of the external device 200 and information about the content to be shared from the external device 200.

According to an embodiment, the communicator 120 may include one or more communication modules configured to receive content to be shared from the external device 200. The one or more communication modules for receiving content to be shared may be any type of communication module capable of transmitting and/or receiving data. For example, the communicator 120 may include a BT communication module for receiving audio content and/or a Wireless Fidelity (Wi-Fi) communication module for receiving audio/video content.

According to an embodiment, the communicator 120 may perform an operation of waking up the processor 150 according to reception of the tagging input from the external device 200 and may provide, to the woken-up processor 150, a boot reason including information about content received through the tagging input.

According to an embodiment, the communicator 120 may receive a tagging input from the external device 200 through at least one of an NFC communication module, a Wi-Fi communication module, and a BLE communication module.

According to an embodiment, the communicator 120 may include an NFC communication module, and the NFC communication module may obtain identification information of the external device 200 and information about content to be transmitted from the external device 200 through a tagging input received from the external device 200, wake up the processor 150 according to the tagging input, and provide, to the woken-up processor 150, the identification information of the external device 200 and the information about the content.

According to an embodiment, the communicator 120 may include a plurality of NFC communication modules, and an NFC communication module, among the plurality of NFC communication modules, that has received the tagging input from the external device 200 may obtain the identification information of the external device 200 and the information about content to be transmitted from the external device 200 through the tagging input received from the external device 200, wake up the processor 150 according to the tagging input, and provide, to the woken-up processor 150, the identification information of the external device 200 and the information about the content. That is, the communicator 120 may cause the processor 150 to recognize which NFC communication module has woken up, or which NFC communication module has received the tagging input, by transmitting information identifying the NFC communication module, among the plurality of NFC communication modules, that has received the tagging input.

According to an embodiment, the communicator 120 may include a BLE communication module, and the BLE communication module may receive a tagging input based on a signal strength of a signal received from the external device 200, obtain identification information of the external device 200 and information about content to be transmitted from the external device 200 through the tagging input, wake up the processor 150 according to the tagging input, and provide, to the woken-up processor 150, the identification information of the external device 200 and the information about the content.

According to an embodiment, the communicator 120 may include a BLE communication module, and the BLE communication module may receive a tagging input based on an acceleration sensor value of the external device 200, obtain identification information of the external device 200 and information about content to be transmitted from the external device 200 through the tagging input, wake up the processor 150 according to the tagging input, and provide, to the woken-up processor 150, the identification information of the external device 200 and the information about the content.

The audio outputter 130 may output audio content processed by the processor 150. Although the audio outputter 130 is shown as included in the electronic device 100 in the example illustrated in FIG. 3, the audio outputter 130 may be disposed outside of the electronic device 100 and connected (e.g., communicatively coupled) to a communication network (e.g., communication network 50 and/or internet), according to another embodiment. For example, the processor 150 may output the audio content processed by the electronic device 100 to an external speaker connected through Bluetooth communication or the like.

According to an embodiment, the audio outputter 130 may output audio content received from the external device 200 for content sharing under the control of the processor 150.

According to an embodiment, the memory 140 may store input data received by the electronic device 100 and data processed by the processor 150. Also, the memory 140 may store an application program including one or more instructions to be executed by the processor 150.

According to an embodiment, the memory 140 may include at least one type of storage medium, such as, but not limited to, a flash memory, a hard disk, a multimedia card micro-type memory, a card-type memory (e.g., a secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disc, or an optical disc.

According to an embodiment, the processor 150 may control an overall operation of the electronic device 100. For example, the processor 150 may control the rollable display 110 to display an image and/or control a processor driving the rollable display 110 to control the rollable display 110 to be inserted into and/or withdrawn from the housing module 190. The processor 150 may control the audio outputter 130 to output an audio signal. The processor 150 may control the memory 140 to load or store necessary information.

According to an embodiment, the processor 150 may be woken up by the communicator 120 and control output of the content received from the external device 200.

According to an embodiment, the processor 150 may determine a content output mode indicating a degree (e.g., size and/or position) to which the rollable display 110 is to be withdrawn according to the information about the content obtained from the communicator 120. The processor 150 may control at least one of the rollable display 110 and the audio outputter 130 to output the content received from the external device 200 through at least one of the rollable display 110 and the audio outputter 130, according to the determined content output mode. According to an embodiment, the information about the content may include at least one of content identification information and identification information of an application used to execute the content.

According to an embodiment, the processor 150 may determine the content output mode based on at least one of the content identification information and the identification information of the application.

According to an embodiment, the processor 150 may identify a content type as one of audio content, audio content including audio information, and audio/video content based on information about the content, and may determine the content output mode according to the identified content type.

According to an embodiment, when the content type is identified as audio content, the processor 150 may determine the content output mode as a closed mode in which the audio content is output without controlling the rollable display 110 to be withdrawn. In response to the determining of the closed mode, the processor 150 may control the audio outputter 130 to output the audio content received from the external device 200 without controlling the rollable display 110 to be withdrawn.

According to an embodiment, when the content type is identified as audio content including audio information, the processor 150 may determine the content output mode as a partial withdrawal mode in which the audio content is output in a partial withdrawal state of the rollable display 110. As such, the processor 150 may control the rollable display 110 to be partially withdrawn in response to the determining of the partial withdrawal mode, may control the rollable display 110 so that the audio information is output (e.g., displayed, presented) by the partially withdrawn rollable display 110, and may control the audio outputter 130 so that the received audio content is output by the audio outputter 130.

According to an embodiment, when the content type is identified as the audio/video content, the processor 150 may determine the content output mode as a full withdrawal mode in which the audio/video content is output in a full withdrawal state of the rollable display 110. As such, the processor 150 may control the rollable display 110 to be fully withdrawn so as to output video content among the audio/video content received from the external device 200 in response to the determining of the full withdrawal mode, and may control the audio outputter 130 to output audio content among the received audio/video content.

According to an embodiment, the processor 150 may control the rollable display 110 so that an aspect ratio of the rollable display 110, which is withdrawn according to an aspect ratio of the video content, is a first aspect ratio (e.g., 16:9) or a second aspect ratio (e.g., 21:9).

According to an embodiment, the external device 200 may include a display 210, a communicator (communication interface) 220, an audio outputter (audio output device) 230, a memory 240, and a processor 250. In various embodiments, the external device 200 may be referred to as a computing device, a mobile device, or an electronic device, and may further include elements in addition to the elements illustrated in FIG. 3, or some elements may be omitted.

According to an embodiment, the display 210 may display an image or video processed by the processor 250 and/or an execution screen of an application.

The communicator 220 according to an embodiment may establish wired communication and/or wireless communication according to a protocol using at least one external device (e.g., electronic device 100). The communicator 220, according to an embodiment, may include one or more modules that enable wireless communication between the external device 200 and a wireless communication system and/or between the external device 200 and a network (e.g., communication network 50 and/or internet) in which another electronic device (e.g., electronic device 100, a server) is located.

According to an embodiment, the communicator 220 may include one or more communication modules configured to perform a tagging input for content sharing with the electronic device 100. For example, the one or more communication modules for performing the tagging input may include, but are not limited to, an NFC communication module or a BLE communication module. The one or more communication modules for performing the tagging input may provide identification information of the external device 200 and information about the content to be shared through the tagging input.

According to an embodiment, the communicator 220 may include one or more communication modules configured to transmit, to the electronic device 100, the content to be shared. One or more communication modules for transmitting the content to be shared may be any type of communication module capable of transmitting and/or receiving data. For example, the communicator 220 may include a BT communication module for transmitting audio content and/or a Wi-Fi communication module for transmitting audio/video content.

The audio outputter 230 may output audio content processed by the processor 250. Although the audio outputter 230 is shown as included in the external device 200 in the example illustrated in FIG. 3, the audio outputter 230 may be disposed outside of the external device 200 and connected (e.g., communicatively coupled) to a communication network (e.g., communication network 50 and/or internet), according to another embodiment. For example, the processor 250 may output the audio content processed by the external device 200 to an external speaker connected through Bluetooth communication or the like.

According to an embodiment, the memory 240 may store input data received by the external device 200 and data processed by the processor 250. Alternatively or additionally, the memory 240 may store an application program including one or more instructions to be executed by the processor 250.

According to an embodiment, the memory 240 may include at least one type of storage medium, such as, but not limited to, a flash memory, a hard disk, a multimedia card micro-type memory, a card-type memory (e.g., an SD or XD memory), a RAM, a SRAM, a ROM, an EEPROM, a PROM, a magnetic memory, a magnetic disc, or an optical disc.

According to an embodiment, the processor 250 may control an overall operation of the external device 200. For example, the processor 250 may control the display 210 to display an image. The processor 250 may control the audio outputter 230 to output an audio signal. The processor 250 may control the memory 240 to load or store necessary information.

According to an embodiment, the processor 250 may execute one or more instructions stored in the memory 240 to perform a content sharing method as disclosed in the present disclosure.

According to an embodiment, the processor 250 may generate data formatted to be transmitted through a tagging input, according to an operation of tagging the external device 200 with the electronic device 100.

According to an embodiment, when a tagging input is performed using the NFC communication module, the processor 250 may generate NFC tag data including identification information of the external device 200, communication connection information, and information about content to be shared, and may control the NFC communication module to transmit the generated NFC tag data to the electronic device 100.

According to an embodiment, when a tagging input is performed using the acceleration sensor and the BLE communication module, the processor 250 may generate a BLE advertising packet including identification information of the external device 200, communication connection information, an acceleration sensor value, and information about content to be shared, and may control the BLE communication module to transmit the generated BLE advertising packet to the electronic device 100.

According to an embodiment, when a tagging input is performed using the BLE communication module, the processor 250 may generate a BLE advertising packet including identification information of the external device 200, communication connection information, radio signal strength information, and information about content to be shared, and may control the BLE communication module to transmit the generated BLE advertising packet to the electronic device 100.

Figure 4:
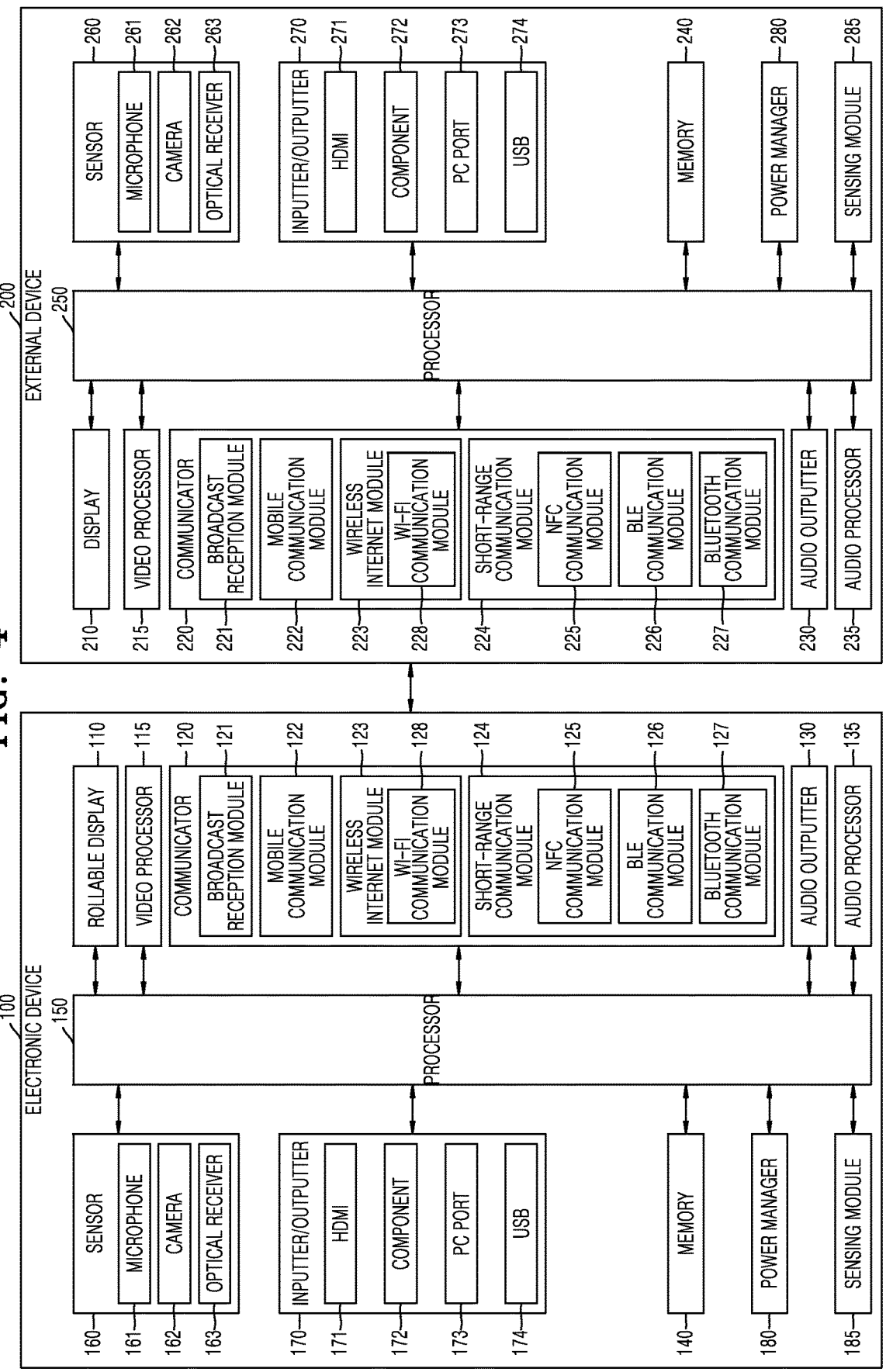
FIG. 4 is a detailed block diagram of an electronic device and an external device, according to FIG. 5 is a flowchart of an operating method of an electronic device, according to FIG. 6 is a flow diagram illustrating an example of a process in which an electronic device obtains information about content to be shared, according to an embodiment.

FIG. 4 is a detailed block diagram of an electronic device 100 and an external device 200, according to an embodiment.

Referring to FIG. 4, the electronic device 100 may include the rollable display 110, a video processor 115, the communicator 120, the audio outputter 130, an audio processor 135, the memory 140, a processor 150, a sensor 160, an inputter/outputter 170, a power manager 180, and a sensing module 185. Elements with the same reference numerals as those of the electronic device 100 illustrated in FIG. 3 may perform the same function and/or may include additional features not mentioned above. A repeated description of the elements with the same reference numerals as those of the electronic device 100 illustrated in FIG. 3 will be omitted.

The video processor 115 may process image data to be displayed by the rollable display 110, and may perform various image processing operations such as decoding, rendering, scaling, noise filtering, frame rate conversion, and resolution conversion on the image data.

According to an embodiment, the communicator 120 may include a broadcast reception module 121, a mobile communication module 122, a wireless Internet module 123, and a short-range communication module 124.

The broadcast reception module 121 may receive a broadcast signal and/or broadcast-related information from an external broadcast management server through a broadcast channel.

The mobile communication module 122 may transmit and/or receive a radio signal to and from at least one of a base station, an external terminal, and a server on a mobile communication network (e.g., communication network 50).

The wireless Internet module 123 may be configured to provide wireless Internet access, and may be installed inside and/or outside the electronic device 100. Examples of wireless Internet technology that may be used include, but are not limited to, wireless local area network (WLAN) (e.g., Wi-Fi), wireless broadband (WiBro), world interoperability for microwave access (WiMAX), and high-speed downlink packet access (HSDPA).

The wireless Internet module 123 may include a Wi-Fi communication module 128. According to an embodiment, the Wi-Fi communication module 128 may receive shared content, in particular, audio/video content from the external device 200. Alternatively or additionally, according to an embodiment, the Wi-Fi communication module 128 may determine whether there is a tagging input according to Wi-Fi radio signal strength information of the external device 200 among tagging inputs using wireless tagging.

The short-range communication module 124 may be configured to perform short-range communications. Examples of short-range communication technology that may be used include, but are not limited to, NFC, Bluetooth, radio frequency identification (RFID), infrared data association (IrDA), ultra wideband (UWB), and ZigBee.

According to an embodiment, the short-range communication module 124 may include at least one of an NFC communication module 125, a BLE communication module 126, and a Bluetooth communication module 127.

According to an embodiment, the NFC communication module 125, the BLE communication module 126, or the Bluetooth communication module 127 included in the short-range communication module 124 may maintain an active state in which power is continuously supplied by the power manager 180 to enable operations, so as to detect a tagging input even in a low-power mode or a standby mode of the electronic device 100.

The NFC communication module 125 may perform data communication with devices located within a certain distance (e.g., 10 cm, or preferably, 4 cm) from the electronic device 100 using very short-range contactless data transfer technology (e.g., RFID). An electronic device (e.g., electronic device 100) employing NFC technology may communicate with another electronic device (e.g., external device 200) employing the NFC technology through at least one of a reader mode, a card emulation mode, and a peer-to-peer mode.

The NFC communication module 125 may establish an NFC link with an NFC communication module 225 of the external device 200 within an NFC communication range (e.g., 10 cm or 4 cm) through tagging. The NFC communication module 125 may communicate with an NFC communication module 225 of the external device 200 in various modes. For example, the various modes may include a card emulation mode, a reader mode, and a peer-to-peer mode. When the NFC communication module 125 operates in the reader mode, the NFC communication module 125 of the electronic device 100 may function as a reader. In this case, the NFC communication module 125 of the electronic device 100 may obtain data from the NFC communication module 225 of the external device 200 operating in the emulation mode. When the NFC communication module 125 of the electronic device 100 operates in the peer-to-peer mode, the NFC communication module 125 of the electronic device 100 and the NFC communication module 225 of the external device 200 may exchange data with each other. The mode of the NFC communication module 125 of the electronic device 100 may be determined according to a predetermined criterion. For example, the mode of the NFC communication module 125 may be set according to a user input and/or a predetermined algorithm.

According to an embodiment, the NFC communication module 125 may receive identification information of the external device 200 and information about content to be shared from the NFC communication module 225 of the external device 200 through a tagging input from the external device 200. The information about the content to be shared may include content identification information about the content to be shared and/or identification information about an application used to execute the content to be shared.

According to an embodiment, in response to the receiving of the tagging input from the external device 200, the NFC communication module 125 may perform an operation of waking up the processor 150 from a sleep state (e.g., standby mode, low-power mode). Alternatively or additionally, the NFC communication module 125 may transmit the identification information of the external device 200 and the information about the content to be shared, according to a request from the processor 150 woken up from the sleep state. According to an embodiment, the identification information of the external device 200 may be used for one or more communication modules of the electronic device 100 to identify a counterpart external device 200 to receive the content to be shared. The information about the content to be shared may be used to determine a content output mode indicating a manner by which the electronic device 100 outputs the shared content from the external device 200.

According to an embodiment, when a tagging input is received from the external device 200, the BLE communication module 126 may detect the tagging input using signal strength information of a signal received from a BLE communication module 226 of the external device 200. Also, the BLE communication module 126 may receive identification information of the external device 200 and information about content to be shared from the BLE communication module 226 of the external device 200 according to the tagging input from the external device 200.

According to an embodiment, in response to the receiving the tagging input from the external device 200, the BLE communication module 126 may perform an operation of waking up the processor 150 from a sleep state (e.g., standby mode, low-power mode). Also, the BLE communication module 126 may transmit the identification information of the external device 200 and the information about the content to be shared, according to the request from the processor 150 woken up from the sleep state.

According to an embodiment, the Bluetooth communication module 127 may receive the content to be shared from a Bluetooth communication module 227 of the external device 200. For example, the content to be shared may include audio content or audio content including audio information.

The audio outputter 130 may output audio content input through the communicator 120 or the inputter/outputter 170 and audio content stored in the memory 140 under the control of the processor 150. The audio outputter 130 may include at least one of a speaker, a headphone output terminal, and a Sony/Philips digital interface (S/PDIF) output terminal.

According to an embodiment, when the processor 150 determines to output the content shared from the external device 200 based on the tagging input from the external device 200, the audio outputter 130 may output the audio content from the external device 200 received from the communicator 120 under the control of the processor 150.

The audio processor 135 may process audio data. The audio processor 135 may perform various processes such as decoding, amplification, and/or noise filtering on the audio data.

The sensor 160 may detect a speech of a user, an image of a user, and/or an interaction of a user, and may include a microphone 161, a camera 162, and an optical receiver 163. The microphone 161 may receive a speech uttered by a user. The microphone 161 may convert the received speech into an electrical signal and output the electrical signal to the processor 150. The camera 162 may receive an image corresponding to a motion of the user including a gesture within a range of camera recognition (e.g., a continuous frame). The optical receiver 163 may receive an optical signal (including a control signal) received from a remote control device. The optical receiver 163 may receive an optical signal corresponding to a user input (e.g., a touch, pressing, a touch gesture, a speech, or a motion) from a remote control device. A control signal may be extracted from the received optical signal under the control of the processor 150.

The inputter/outputter 170 receives video (e.g., a moving picture), audio (e.g., a speech, music, etc.), and/or additional information (e.g., an electronic program guide (EPG), etc.) from the outside of the electronic device 100 under the control of the processor 150. The inputter/outputter 170 may include one of a high-definition multimedia interface (HDMI) port 171, a component jack 172, a personal computer (PC) port 173, and a universal serial bus (USB) port 174. The inputter/outputter 170 may include any combination of the HDMI port 171, the component jack 172, the PC port 173, and the USB port 174.

The power manager 180 may perform power control and power management of each element (e.g., component, module) of the electronic device 100. For example, when the electronic device 100 operates in the normal mode, the power manager 180 may allow each element to operate by controlling power to be supplied to each element of the electronic device 100. For another example, when the electronic device 100 operates in the standby mode or the low-power mode, the power manager 180 may maintain a low power consumption state of the electronic device 100 by controlling power supply to one or more elements of the electronic device 100 to be stopped.

According to an embodiment, in the standby mode or low-power mode state of the electronic device 100, the power manager 180 may control power supply to one or more elements including the processor 150 to be stopped. Even in the standby mode or low-power mode state of the electronic device 100, the power manager 180 may maintain a power supply state to one or more communication modules of the communicator 120, such that the one or more communication modules may detect a tagging input from the external device 200, and, in response to the detecting of the tagging input, the one or more communication modules may perform an operation of waking up the processor 150. The power manager 180 may control power to be supplied to the processor 150 by the waking-up operation.

According to an embodiment, the sensing module 185 may measure a physical quantity or detect an operation state of the electronic device 100 to convert measured or detected information into an electrical signal. The sensing module 185 may include at least one of a magnetic sensor, a position sensor (e.g., a global positioning system (GPS) sensor), an acceleration sensor, an atmospheric pressure sensor, a temperature/humidity sensor, a proximity sensor, an infrared sensor, a red-green-blue (RGB) sensor, and a gyroscope sensor, but is not limited thereto.

According to an embodiment, the sensing module 185 may include an acceleration/gyro sensor. According to an embodiment, the acceleration/gyro sensor may be used to detect a tagging input from the external device 200 together with the BLE communication module 126. For example, when there is a contact or impact from the external device 200, the acceleration/gyro sensor may detect a sensor value and transmit the detected sensor value to the BLE communication module 126.

The memory 140 according to an embodiment may store programs for processing and controlling the operations of the processor 150 and may store data input to the electronic device 100 or output from the electronic device 100. Also, the memory 140 may store data necessary for an operation of the electronic device 100. Also, the programs stored in the memory 140 may be classified into a plurality of modules according to functions thereof.

In an embodiment, the processor 150 may execute instructions stored in the memory 140 to drive a content sharing application. The content sharing application may include one or more instructions for performing the content sharing method described in the present disclosure. Various modules mentioned in various embodiments of the disclosure may be implemented as hardware or software. In various embodiments of the disclosure, an operation performed by the content sharing application may be understood as an operation performed by the processor 150.

The external device 200 may include the display 210, a video processor 215, the communicator 220, the audio outputter 230, an audio processor 235, the memory 240, the processor 250, a sensor 260, an inputter/outputter 270, a power manager 280, and a sensing module 285. Elements with the same reference numerals as those of the external device 200 illustrated in FIG. 3 may perform the same function and/or may include additional features not mentioned above. A repeated description of the elements with the same reference numerals as those of the external device 200 illustrated in FIG. 3 will be omitted. In various embodiments, the external device 200 may be referred to as an electronic device, a computing device, or a portable terminal device, but will be mainly referred to as an external device in the present disclosure to be distinguished from the electronic device 100. The external device 200 may further include elements in addition to the elements illustrated in FIG. 4, or some elements may be omitted.

The video processor 215 may process image data to be displayed by the display 210, and may perform various image processing operations such as decoding, rendering, scaling, noise filtering, frame rate conversion, and resolution conversion on the image data.

According to an embodiment, the communicator 220 may include a broadcast reception module 221, a mobile communication module 222, a wireless Internet module 223, and a short-range communication module 224.

The broadcast reception module 221 may receive a broadcast signal and/or broadcast-related information from an external broadcast management server through a broadcast channel.

The mobile communication module 222 may transmit and/or receive a radio signal to and from at least one of a base station, an external terminal, and a server on a mobile communication network (e.g., communication network 50).

The wireless Internet module 223 refers to a module used for wireless Internet access, and may be installed inside or outside the external device 200. Examples of wireless Internet technology that may be used include, but are not limited to, WLAN (e.g., Wi-Fi), WiBro, WiMAX, or HSDPA. For example, the wireless Internet module 223 may include a Wi-Fi communication module 228, and the Wi-Fi communication module 228 may transmit, to the electronic device 100, audio/video content to be shared with the electronic device 100.

The short-range communication module 224 is configured to perform short-range communication. Examples of short-range communication technology that may be used include, but are not limited to, NFC, Bluetooth, RFID, IrDA, UWB, or ZigBee.

According to an embodiment, the short-range communication module 224 may include at least one of the NFC communication module 225, the BLE communication module 226, and the Bluetooth communication module 227.

The NFC communication module 225 may establish an NFC link with an NFC communication module 125 of the electronic device 100 within an NFC range through tagging.

According to an embodiment, the NFC communication module 225 may transmit identification information of the external device 200 and information about content to be shared to the NFC communication module 125 of the electronic device 100 through a tagging input to the electronic device 100. The information about the content to be shared may include content identification information about the content to be shared and/or identification information about an application used to execute the content to be shared. For example, the NFC communication module 225 may obtain information about content being output from the external device 200 through the processor 250 during the tagging input, and may transmit the information about the content to be shared together with the identification information of the external device 200 to the electronic device 100.

According to an embodiment, the BLE communication module 226 may perform a tagging input through a tagging operation by the external device 200. Through the tagging input, the BLE communication module 226 may transmit the identification information of the external device 200 and the information about the content to be shared to the BLE communication module 126 of the electronic device 100. According to an embodiment, the BLE communication module 226 may perform a tagging operation using an acceleration sensor value and/or may perform a tagging operation using signal strength information of a radio signal.

According to an embodiment, the Bluetooth communication module 227 may transmit the content to be shared to the Bluetooth communication module 127 of the electronic device 100. For example, the content to be shared may include audio content or audio content including audio information.

The audio outputter 230 may output audio content stored in the communicator 220 or the memory 240 under the control of the processor 250. The audio outputter 230 may include at least one of a speaker, a headphone output terminal, and a S/PDIF output terminal.

The audio processor 235 may process audio data. The audio processor 135 may perform various processes, such as decoding, amplification, or noise filtering, on the audio data.

The sensor 260 may detect a speech of a user, an image of a user, or an interaction of a user, and may include a microphone 261, a camera 262, and an optical receiver 263. The microphone 261 may receive a speech uttered by a user.

The microphone 261 may convert the received speech into an electrical signal and output the electrical signal to the processor 250. The camera 262 may receive an image corresponding to a motion of a user including a gesture within a range of camera recognition (e.g., a continuous frame). The optical receiver 263 may receive an optical signal (including a control signal) received from a remote control device. The optical receiver 263 may receive an optical signal corresponding to a user input (e.g., a touch, pressing, a touch gesture, a speech, or a motion) from a remote control device. A control signal may be extracted from the received optical signal under the control of the processor 250.

The inputter/outputter 270 receives video (e.g., a moving picture), audio (e.g., a speech, music, etc.), and additional information (e.g., an electronic program guide (EPG), etc.) from the outside of the external device 200 under the control by the processor 250. The inputter/outputter 270 may include one of a HDMI port 271, a component jack 272, a PC port 273, and a USB port 274. The inputter/outputter 270 may include any combination of the HDMI port 271, the component jack 272, the PC port 273, and the USB port 274.

The power manager 280 may perform power control and power management of each element of the external device 200.

According to an embodiment, the sensing module 285 may measure a physical quantity or detect an operation state of the external device 200 to convert measured or detected information into an electrical signal. The sensing module 285 may include at least one of a magnetic sensor, a position sensor (e.g., a GPS sensor), an acceleration sensor, an atmospheric pressure sensor, a temperature/humidity sensor, a proximity sensor, an infrared sensor, an RGB sensor, and a gyroscope sensor, but is not limited thereto.

According to an embodiment, the sensing module 285 may include an acceleration/gyro sensor. According to an embodiment, the acceleration/gyro sensor may be used to perform a tagging operation into the electronic device 100 together with the BLE communication module 226. For example, the acceleration/gyro sensor may transmit, to the BLE communication module 226, a sensor value detected by an operation of bringing the external device 200 into contact with or close to the electronic device 100.

According to an embodiment, the memory 240 may store programs for processing and controlling the operations of the processor 250 and may store data input to the external device 200 or output from the external device 200. Alternatively or additionally, the memory 240 may store data necessary for an operation of the external device 200. Alternatively or additionally, the programs stored in the memory 240 may be classified into a plurality of modules according to functions thereof.

In an embodiment, the processor 250 may execute instructions stored in the memory 240 to drive a content sharing application. The content sharing application may include one or more instructions for performing the content sharing method described in the present disclosure. Various modules mentioned in various embodiments of the disclosure may be implemented as hardware or software. In various embodiments of the disclosure, an operation performed by the content sharing application may be understood as an operation performed by the processor 250.

Figure 5:
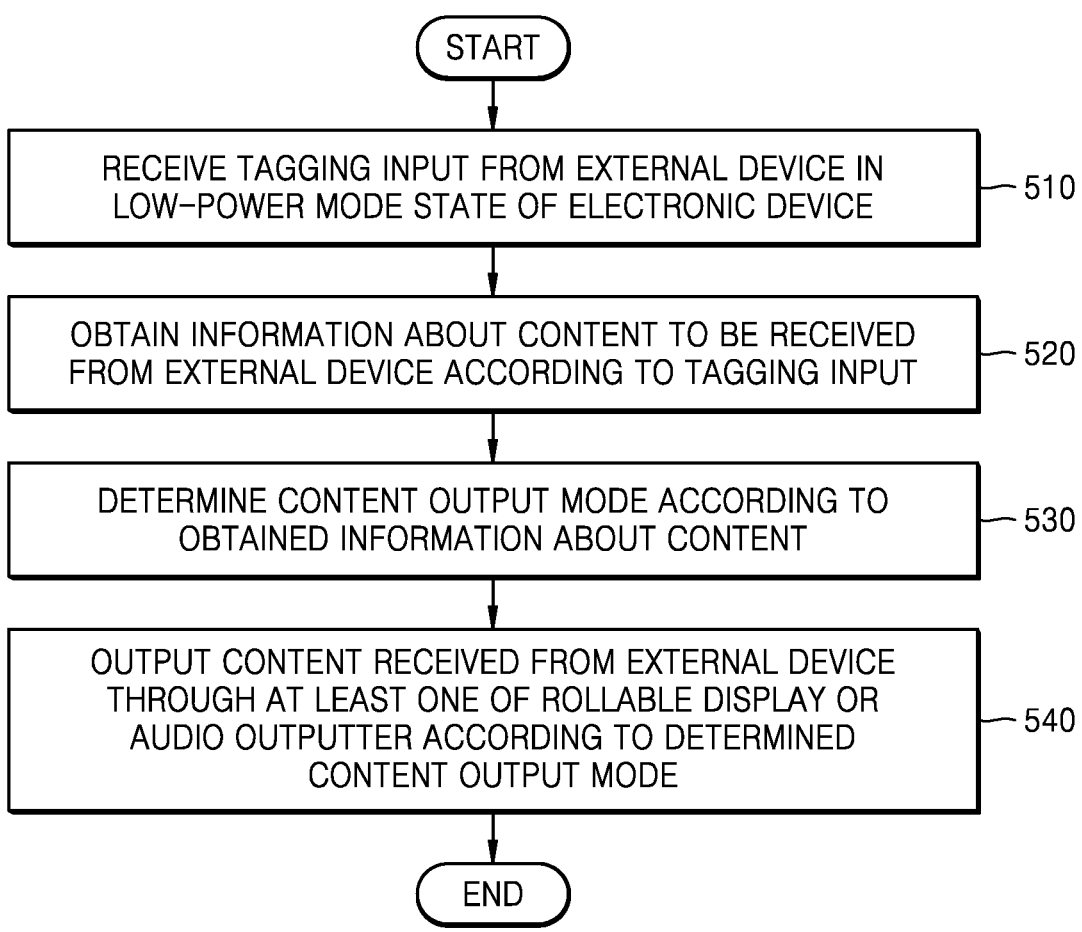

FIG. 5 is a flowchart of an operating method of an electronic device 100, according to an embodiment.

Referring to FIG. 5, in operation 510, the electronic device 100 may receive a tagging input from an external device 200, in a low-power mode state of the electronic device 100. For example, the electronic device 100 may receive a tagging input from the external device 200 during a low-power mode state in which power supplied to one or more elements of the electronic device 100 is cut off to maintain the low-power mode state.

According to an embodiment, the electronic device 100 may receive a tagging input from the external device 200 by one or more communication modules that may remain active by maintaining power supply to the one or more communication modules even in the low-power mode state of the electronic device 100. For example, the one or more communication modules that may remain active in the low-power mode state of the electronic device 100 may include an NFC communication module or a Bluetooth communication module.

For example, when the user brings the external device 200 in near proximity (e.g., a very short distance within a predetermined threshold) to or in contact with an NFC tag installed in the electronic device 100, the NFC communication module of the electronic device 100 may communicate with the NFC communication module of the external device 200 to obtain wireless communication configuration information including information such as an NFC tag identification (ID) of the external device 200, an internet protocol (IP) address of the external device 200, or the like.

According to an embodiment, the one or more communication modules that receive the tagging input may perform an operation of waking up the processor 150 from a sleep state (e.g., standby mode, low-power mode) due to the power supply to the processor 150 being cut off.

In operation 520, the electronic device 100 may obtain information about content to be received from the external device 200 according to the tagging input.

According to an embodiment, the one or more communication modules activated in the low-power mode state of the electronic device 100 may receive identification information of the external device 200 and information about content to be shared by the external device 200 through a tagging input. The information about the content to be shared by the external device 200 may include content identification information of the content to be shared and/or identification information of an application used to execute the content to be shared. According to an embodiment, the information about the content may include an identifier of the content or a URL of the content.

According to an embodiment, the one or more communication modules may transmit, to the woken-up processor 150, external device identification information of the external device 200 and the information about the content to be shared by the external device 200.

In operation 530, the electronic device 100 may determine a content output mode according to the obtained information about the content.

According to an embodiment, the processor 150 of the electronic device 100 may determine a content output mode indicating a method of outputting corresponding content to be shared based on the information on the content received from the one or more communication modules. The processor 150 may determine a type of the content to be shared using identification information of the content to be shared, identification information of an application used to execute the content to be shared, a file extension of the content, or the like. The type of the content may indicate whether the content is audio content, audio/video content, or audio content including audio information.

In an embodiment, the processor 150 may determine the type of the content based on the identification information of the content to be shared. That is, when the identification information of the content includes identification information indicating that the content is audio content or video content, the processor 150 may determine the type of the content based on the identification information. In an embodiment, the processor 150 may determine the type of the content based on the identification information of the application used to execute the content to be shared. For example, when the identification information of the application indicates a music application, the processor 150 may determine that the content to be shared is audio content. In an embodiment, the processor 150 may determine the type of the content based on the file extension of the content to be shared. For example, when a content file identifier includes identification information indicating audio content or video content, the processor 150 may determine the type of the content based on the identification information.

According to an embodiment, the processor 150 may determine the content output mode based on the determined type of the content. For example, the content output mode may include a closed mode, a partial withdrawal mode, and a full withdrawal mode. For example, when the processor 150 determines that the content to be shared is audio content, the processor 150 may determine the content output mode as the closed mode in which the processor 150 controls the audio outputter 130 to output the audio content and controls the rollable display 110 to not be withdrawn. For another example, when the processor 150 determines that the content to be shared is audio content including audio information, the processor 150 may determine the content output mode as a partial withdrawal mode in which the processor 150 controls the audio outputter 130 to output the audio content and controls the rollable display 110 to be partially withdrawn to a size used to display the audio information. For another example, when the processor 150 determines that the content to be shared is audio/video content, the processor 150 may determine the content output mode as a full withdrawal mode in which the processor 150 controls the audio outputter 130 to output the audio content and controls the rollable display 110 to be fully withdrawn. Alternatively or additionally, in the full withdrawal mode, the processor 150 may control the rollable display 110 to be withdrawn to a degree (e.g., size and/or position) suitable for an aspect ratio of the video content to be shared.

In operation 540, the electronic device 100 may output the content received from the external device 200 through at least one of the rollable display 110 and the audio outputter 130, according to the determined content output mode.

According to an embodiment, the processor 150 of the electronic device 100 may identify a counterpart external device 200, from which the content to be shared is to be received, based on the identification information of the external device 200 received through the tagging input, may establish a communication connection with the external device 200 based on the identification information of the external device 200 through one or more communication modules, and may receive the content to be shared from the connected external device 200.

According to the type of the content to be shared, a transmission/reception bandwidth of the shared content may vary, and thus, the processor 150 of the electronic device 100 may determine a communication module to be responsible for receiving the shared content according to the type of the content. For example, when the content to be shared is audio/video content, the processor 150 may select a Wi-Fi communication module to receive the shared content. For another example, when the content to be shared is audio content, the processor 150 may select a Bluetooth communication module to receive the shared content.

According to an embodiment, the processor 150 may output the content to be shared through at least one of the rollable display 110 and the audio outputter 130, according to the content output mode. For example, in the closed mode, the processor 150 may control the received audio content to be output through the audio outputter 130 without controlling the rollable display 110 to be withdrawn. For another example, in the partial withdrawal mode, the processor 150 may control the rollable display 110 to be partially withdrawn, control audio information to be output through the partially withdrawn rollable display 110, and control the received audio content to be output through the audio outputter 130. For another example, in the full withdrawal mode, the processor 150 may control the rollable display 110 to be fully withdrawn, control video content to be output through the fully withdrawn rollable display 110, and control the received audio content to be output through the audio outputter 130.

Hereinafter, a method by which the electronic device 100 shares content from the external device 200 will be described in detail with reference to FIGS. 6 to 9.

Figure 6:
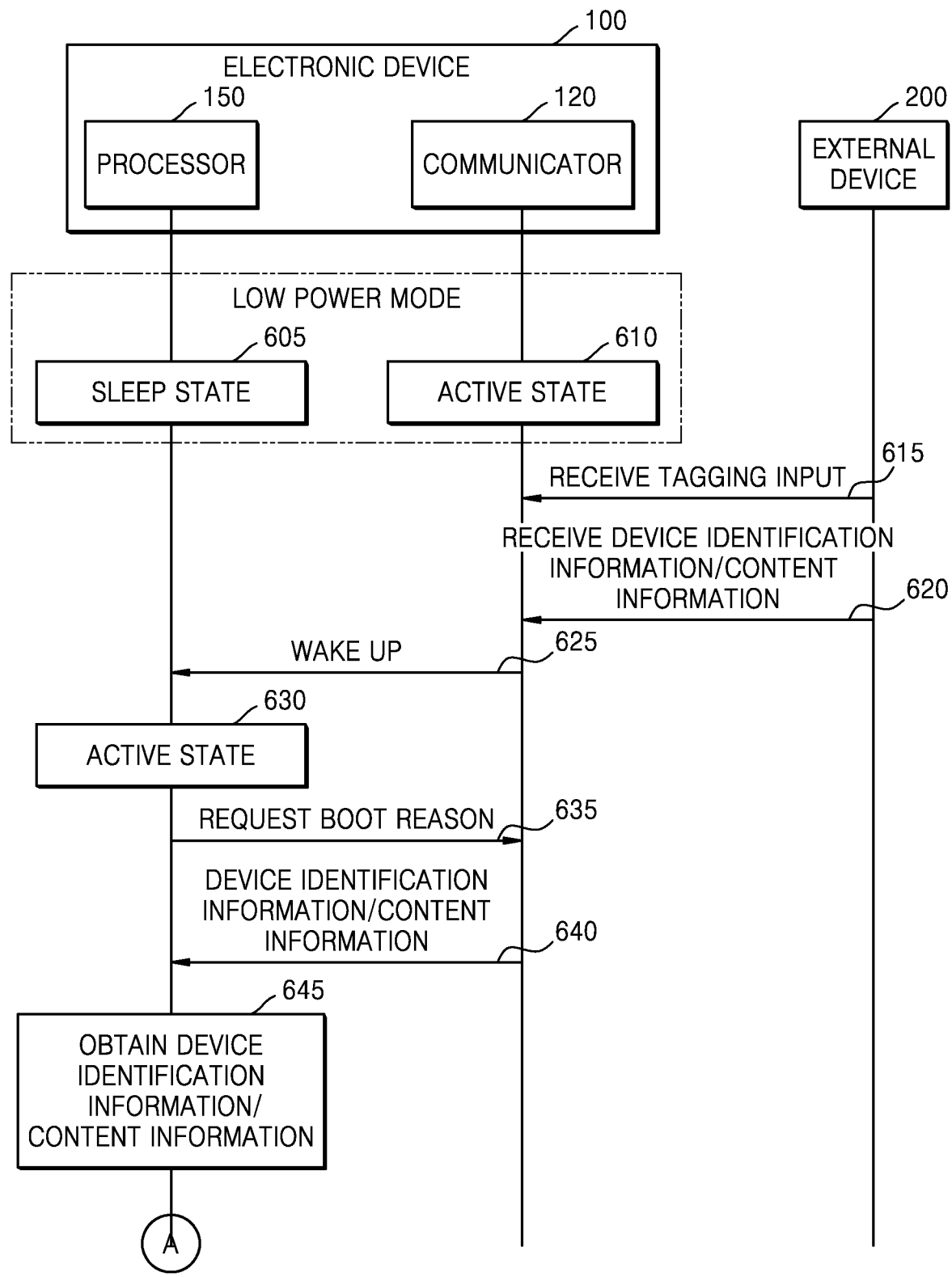

FIG. 6 is a flow diagram illustrating an example of a process in which an electronic device 100 obtains information about content to be shared, according to an embodiment.

Referring to FIG. 6, in a low-power mode state of the electronic device 100, the processor 150 may be in a sleep state (operation 605), and the communicator 120 may be in an active state (operation 610). In general, the low-power mode state of the electronic device 100 may refer to a standby (or low-power) state in which power supply to one or more elements of the electronic device 100 is cut off so that the electronic device 100 may detect a power-on input from a user while consuming a reduced amount of power. According to an embodiment of the disclosure, the communicator 120 used to detect a tagging input of the external device 200 may maintain an active state by maintaining power supplied to the communicator 120, so that the electronic device 100 may detect the tagging input while in the low-power mode state. The communicator 120 may include a plurality of communication modules for performing communication according to various communication protocols. According to an embodiment, a communication module for detecting the tagging input of the external device 200 among the plurality of communication modules in the low-power mode state of the electronic device 100 may maintain an active state, but other communication modules may maintain a sleep state like the processor 150.

In operation 615, while the electronic device 100 is in the low-power mode state, the communicator 120 of the electronic device 100 may receive the tagging input from the external device 200. The tagging input may be received by an operation of bringing the external device 200 into contact with or close proximity to the electronic device 100. The tagging input of the external device 200 may be detected through various short-range communication modules, for example, using an NFC communication module or a BT communication module.

The external device 200 that performs the tagging input may be in a state of executing and outputting content. For example, the user may be in a state of playing audio content such as music or audio/video content such as a movie using the external device 200. For example, to listen to music using the electronic device 100 with better audio performance while listening to music using the external device 200 or to share music listened to through the external device 200 with other users, the user may perform an operation of tagging the external device 200 through which music is playing with the electronic device 100. Alternatively or additionally, for example, when the user wants to watch a movie on a large screen while watching a movie using the external device 200 or wants to conveniently share the movie that the user is watching with other users, the user may perform an operation of tagging the external device 200 with the electronic device 100 in a standby mode. Because the content output by the external device 200 is shared by the electronic device 100 as described in the disclosure only through a simple tagging operation using the external device 200, the user may realize a content sharing operation more conveniently and easily. Also, because the tagging operation may be recognized even in the low-power mode state of the electronic device 100, the user may skip a process of turning on the electronic device 100 in the standby state in advance to share the content, thereby minimizing inconvenient operations and/or delay of the user.

In operation 620, the communicator 120 of the electronic device 100 may receive identification information of the external device 200 and information about content to be shared from the external device 200 through a tagging input operation and/or a subsequent operation of the tagging input.

The identification information of the external device 200 may include an identifier of the external device 200, address information of the external device 200, and communication protocol information used to communicate with the external device 200.

The information about the content to be shared may include information about the content which is currently output from the external device 200 and is to be shared with the electronic device 100, and may include content identification information, a content file name, and/or identification information of an application used to execute the content.

In operation 625, the communicator 120 of the electronic device 100 may perform an operation of waking up the processor 150 from the sleep state according to detection of the tagging input from the external device 200. For example, the communicator 120 may wake up the processor 150 from the sleep state by transmitting a wake-up signal to the processor 150.

In operation 630, the processor 150 may be supplied with power according to the wake-up signal of the communicator 120 and may transition from the sleep state to an active state.

In operation 635, the processor 150 that has transitioned to the active state may request a boot reason to the communicator 120 to inquire about the reason for waking up the processor 150.

In operation 640, the communicator 120 may transmit, to the processor 150, the identification information of the external device 200 and the information about the content to be shared in response to the request for the boot reason from the processor 150. For example, the identification information of the external device 200 and the information about the content to be shared may be transmitted together with information such as a code for an operation to be performed by the processor 150, such as, an identification code indicating that a content sharing operation is required, and thus, information about what operation needs to be performed by the processor 150 may be provided.

In operation 645, the processor 150 may obtain, from the communicator 120, the identification information of the external device 200 and the information about the content to be shared. Then, the process may proceed to operation A.

Figure 7:
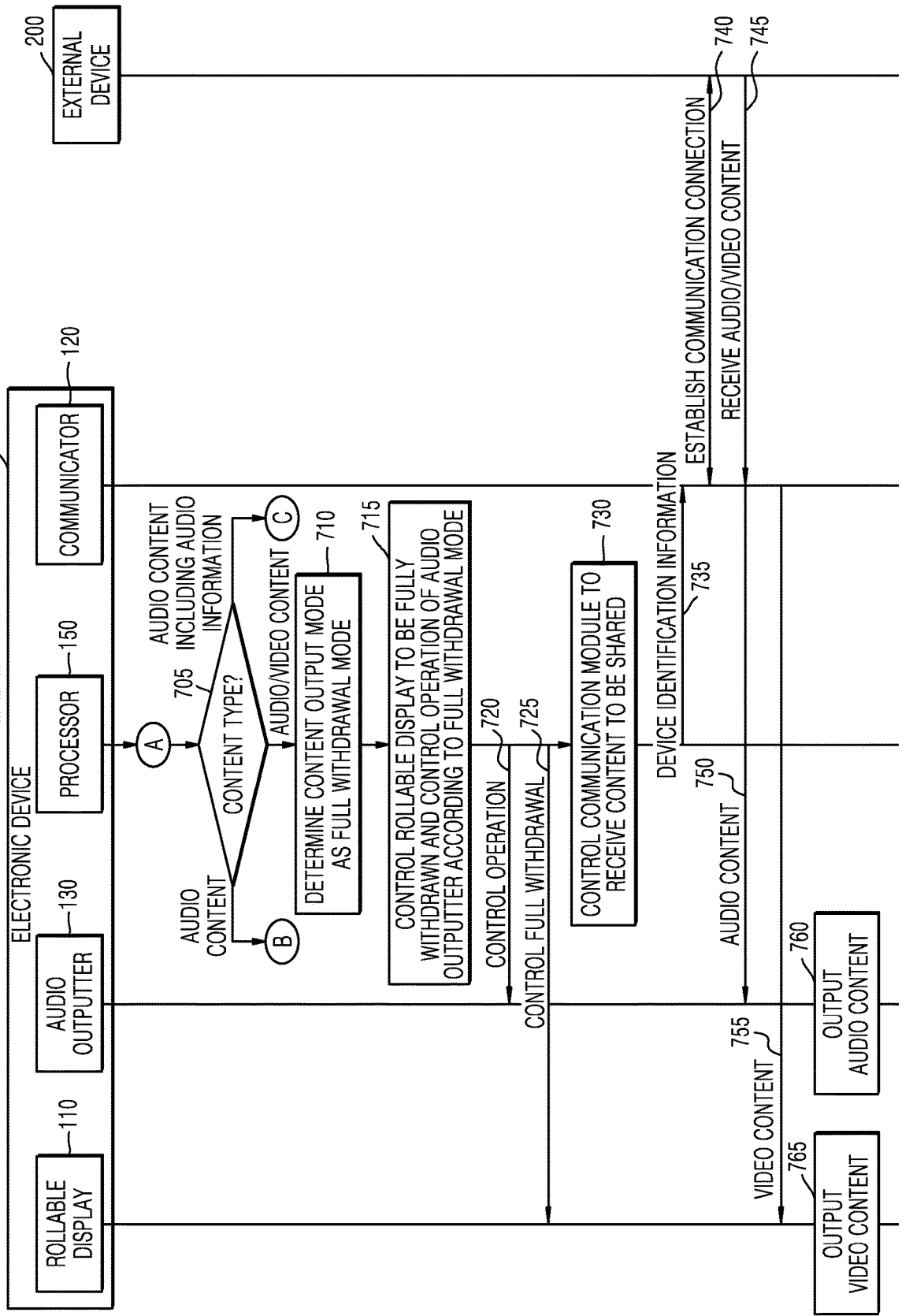
FIG. 7 is a flow diagram of a process of an operation of an electronic device according to a full withdrawal mode, according to an embodiment.

FIG. 7 is a flow diagram of a process of an operation of an electronic device 100 according to a full withdrawal mode, according to an embodiment.

Referring to FIG. 7, in operation 705, the processor 150 of the electronic device 100 may identify a type of content based on information about content to be shared, which is received from the communicator 120. For example, the processor 150 may identify whether the type of the content to be shared is audio content, audio content including audio information, or audio/video content. When the type of the content to be shared is audio content, the process may proceed to operation B, when the type of the content to be shared is audio content including audio information, the process may proceed to operation C, and when the type of the content to be shared is audio/video content, the process may proceed to operation 710.

According to an embodiment, the processor 150 may identify the type of the content to be shared based on the content identification information. For example, when the content identification information includes information indicating the type of the content, the processor 150 may determine the type of the content using the content identification information.

According to an embodiment, the processor 150 may identify the type of content to be shared based on a content file extension. For example, when the content file extension includes information indicating the type of the content, the processor 150 may determine the type of the content using the content file extension.

According to an embodiment, the processor 150 may determine the type of content to be shared based on information about an application used to play or execute the content to be shared. For example, when the information about the application indicates that the application is a music application, the processor 150 may identify that the type of the content to be shared is audio content. For example, when the information about the application indicates that the application is a movie or video providing application, the processor 150 may identify that the type of the content to be shared is audio/video content.

When the processor 150 determines that the type of the content to be shared is audio/video content and proceeds to operation 710, the processor 150 may determine a full withdrawal mode a content output mode in operation 710. That is, when the processor 150 determines that the type of the content to be shared includes both audio content and video content, the processor 150 may determine the content output mode as the full withdrawal mode so that the rollable display 110, which may be in a state of being wound inside the housing module 190 in a standby mode, may be withdrawn and controlled to output the video content. The full withdrawal mode may indicate a mode in which the rollable display 110 is controlled to be fully withdrawn to output video content and the audio outputter 130 is also controlled to output audio content.

In operation 715, the processor 150 may control the rollable display 110 to be fully withdrawn and control the audio outputter 130 to operate, in response to the determining of the content output mode as the full withdrawal mode.

In operation 720, the processor 150 may control an operation of the audio outputter 130. For example, the processor 150 may control the operation of the audio outputter 130 by controlling power to be supplied to the audio outputter 130.

In operation 725, the processor 150 may control the rollable display 110 to be fully withdrawn. For example, the processor 150 may control a rollable display driver so that power is supplied to the rollable display 110 and the rollable display 110 is fully withdrawn from the housing module 190.

In operation 730, the processor 150 may control the communicator 120 to receive the content to be shared. According to an embodiment, the processor 150 may determine a communication module to be used to receive the content to be shared according to the type of the content to be shared. For example, when the content to be shared is audio/video content that requires a large amount of data such as a movie, the processor 150 may select a communication module that may provide a bandwidth corresponding thereto. For example, the processor 150 may use a Wi-Fi communication module to receive audio/video content.

In operation 735, the processor 150 may transmit identification information of the external device 200 to the determined communication module for receiving the content to be shared. The identification information of the external device 200 may include a communication address of the external device 200 or the like, and may be used by the communication module to establish communications (e.g., connect) with the external device 200. For example, when the communication module is a Wi-Fi communication module, the communication address of the external device 200 may include a Wi-Fi communication address of the external device 200.

In operation 740, the communication module may establish a communication connection with the external device 200 using device identification information received from the processor 150. For example, the communication module may establish a Wi-Fi communication connection with the Wi-Fi communication module of the external device 200 using the Wi-Fi communication address of the external device 200 received from the processor 150.

In operation 745, after the communication connection is established, the communication module of the electronic device 100 may receive, from the external device 200, audio/video content that is content to be shared.

In operation 750, the audio content received through the communication module may be transmitted to the audio outputter 130 under the control of the processor 150.

In operation 755, the video content received through the communication module may be transmitted to the fully withdrawn rollable display 110 under the control of the processor 150.

In operation 760, the audio outputter 130 may output the received audio content, and in operation 765, the fully withdrawn rollable display 110 may output the video content. According to an embodiment, a degree of withdrawal of the rollable display 110 may be adjusted according to an aspect ratio of the video content. For example, when the aspect ratio of the video content is a first aspect ratio (e.g., 16:9), the degree of withdrawal of the rollable display 110 may be adjusted to be a display area having the first aspect ratio, or when the aspect ratio of the video content is a second aspect ratio (e.g., 21:9), the degree of withdrawal of the rollable display 110 may be adjusted to be a display area having the second aspect ratio. Information about the aspect ratio of the video content to be shared may be received through a tagging input and/or may be obtained while the video content is received. For example, the video content may comprise metadata and/or information indicating the aspect ratio of the video content.

Figure 8:
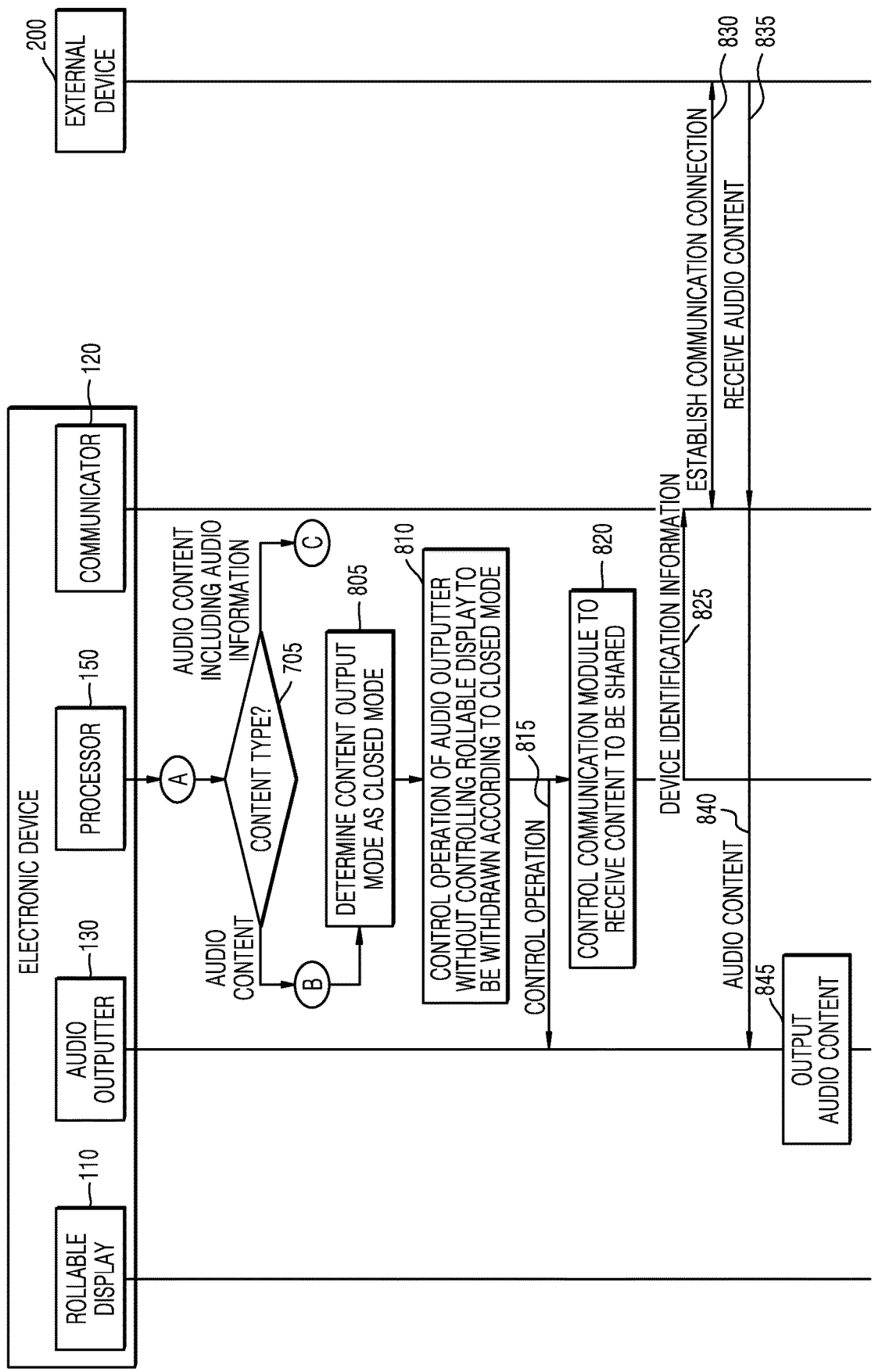
FIG. 8 is a flow diagram of a process of an operation of an electronic device according to a closed mode, according to an embodiment.

FIG. 8 is a flow diagram of a process of an operation of an electronic device 100 according to a closed mode, according to an embodiment.

Referring to FIG. 8, when the processor 150 of the electronic device 100 determines that a type of content to be shared is audio content (B) in operation 705 and proceeds to operation 805, the processor 150 may determine a closed mode as a content output mode in operation 805. That is, when the processor 150 determines that the type of the content to be shared is audio content, outputting of video content is not required, and thus, the processor 150 may determine the content output mode as the closed mode. As such, the rollable display 110, which may be in a state of being wound up inside the housing module 190 in a standby mode, may not controlled by the processor 150 to be withdrawn. The closed mode may indicate a mode in which the audio outputter 130 is controlled to output audio content without controlling the rollable display 110 to be withdrawn.

In operation 810, in response to the determining of the content output mode as the closed mode, the processor 150 may control the audio outputter 130 to operate without controlling the rollable display 110 to be withdrawn.

In operation 815, the processor 150 may control an operation of the audio outputter 130. For example, the processor 150 may control the operation of the audio outputter 130 by controlling power to be supplied to the audio outputter 130.

In operation 820, the processor 150 may control one or more communication modules of the communicator 120 to receive the content to be shared. According to an embodiment, the processor 150 may determine a communication module to be used to receive the content to be shared according to the type of the content to be shared. For example, when the content to be shared is audio content that may require a relatively small amount of data, such as music, the processor 150 may select a communication module that may provide a bandwidth corresponding thereto. For example, the processor 150 may use a Bluetooth communication module to receive audio content.

In operation 825, the processor 150 may transmit identification information of the external device 200 to the determined communication module for receiving the content to be shared. The identification information of the external device 200 may include a communication address of the external device 200 or the like, and may be used by the communication module to establish communications (e.g., connect) with the external device 200. For example, when the communication module is the Bluetooth communication module, the communication address of the external device 200 may include a Bluetooth communication address of the external device 200.

In operation 830, the communication module may establish a communication connection with the external device 200 using device identification information received from the processor 150. For example, the communication module may establish a Bluetooth communication connection with the Bluetooth communication module of the external device 200 using the Bluetooth communication address of the external device 200 received from the processor 150.

In operation 835, after the communication connection is established, the communication module of the electronic device 100 may receive, from the external device 200, audio content that is content to be shared.

In operation 840, the audio content received through the communication module may be transmitted to the audio outputter 130 under the control of the processor 150.

In operation 845, the audio outputter 130 may output the received audio content.

As described above, when the content to be shared is audio content, the audio content is directly received and output through the audio outputter 130 without controlling the rollable display 110 to be withdrawn, and thus, an operation of controlling the rollable display 110 to be unnecessarily withdrawn may be prevented.

Figure 9:
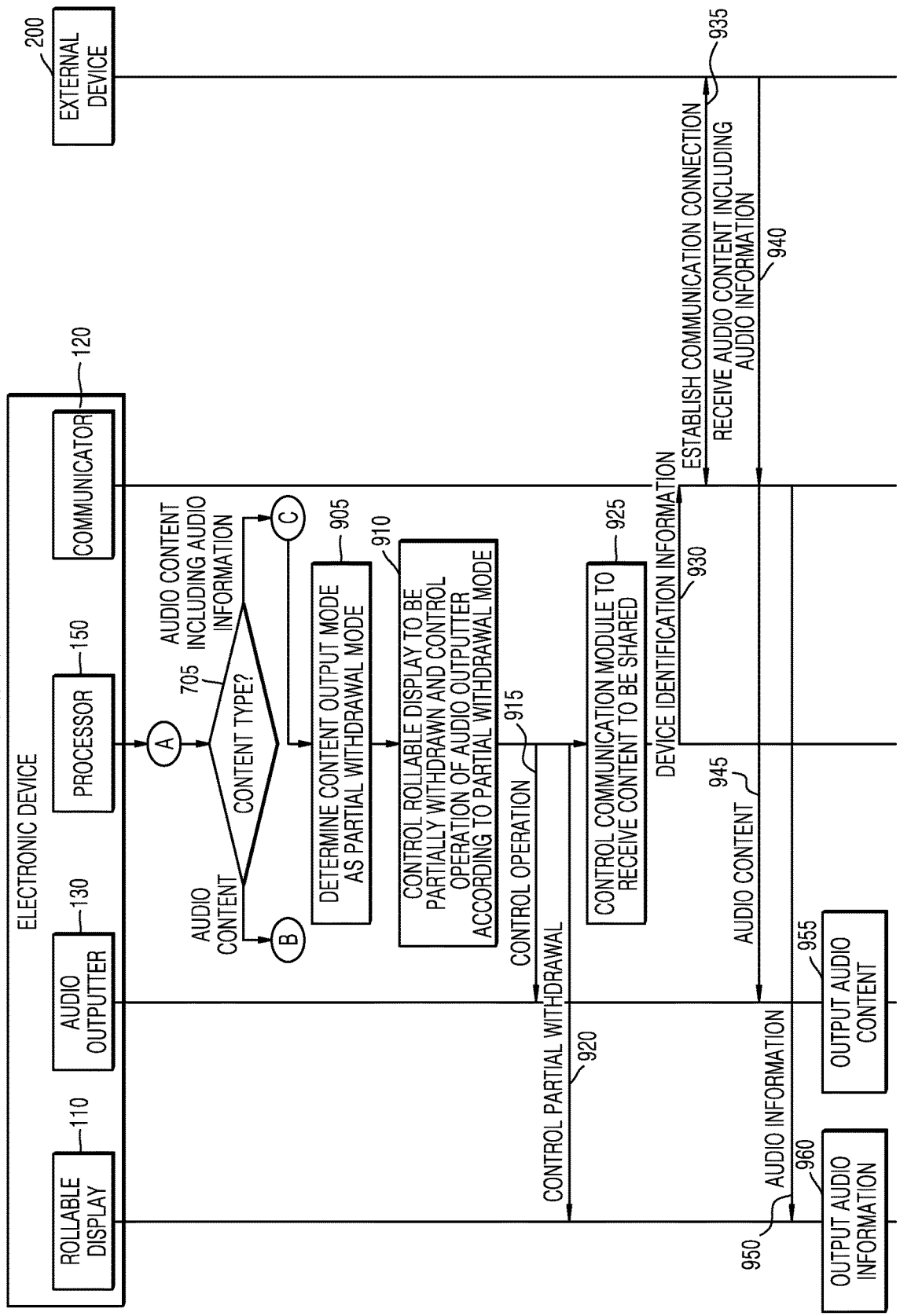
FIG. 9 is a flow diagram of a process of an operation of an electronic device according to a partial withdrawal mode, according to an embodiment.

FIG. 9 illustrates a flow diagram of an operation of an electronic device 100 according to a partial withdrawal mode, according to an embodiment.

Referring to FIG. 9, when the processor 150 of the electronic device 100 determines that the type of content to be shared is audio content including audio information in operation 705 and proceeds to operation 905, the processor 150 may determine the content output mode as a partial withdrawal mode in operation 905. That is, when the processor 150 determines that the type of content to be shared is audio content including audio information, the processor 150 may determine the content output mode as the partial withdrawal mode so that the rollable display 110, which may be in a state of being wound up inside the housing module 190 in a standby mode, may be partially withdrawn and controlled to output the audio information. The partial withdrawal mode may indicate a mode in which the rollable display 110 is controlled to be partially withdrawn to output audio information and the audio outputter 130 is also controlled to output audio content.

In operation 910, in response to the determining of the content output mode as the partial withdrawal mode, the processor 150 may control the rollable display 110 to be partially withdrawn and may control the audio outputter 130 to operate.

In operation 915, the processor 150 may control an operation of the audio outputter 130. For example, the processor 150 may control the operation of the audio outputter 130 by controlling power to be supplied to the audio outputter 130.

In operation 920, the processor 150 may control the rollable display 110 to be partially withdrawn. For example, the processor 150 may control a rollable display driver so that power is supplied to the rollable display 110 and the rollable display 110 is partially withdrawn from the housing module 190. The processor 150 may provide, to the rollable display driver, information indicating a degree of withdrawal so that the rollable display 110 may be withdrawn to a size sufficient to display the audio information.

In operation 925, the processor 150 may control the communicator 120 to receive the content to be shared. According to an embodiment, the processor 150 may determine a communication module to be used to receive the content to be shared according to the type of the content to be shared. For example, when the content to be shared is audio content that may not require a large amount of data, such as music, the processor 150 may select a communication module that may provide a bandwidth corresponding thereto. For example, the processor 150 may use the Bluetooth communication module to receive audio content.

In operation 930, the processor 150 may transmit identification information of the external device 200 to the selected communication module for receiving the content to be shared. The identification information of the external device 200 may include a communication address of the external device 200 that may be used by the communication module to establish communications (e.g., connect) with the external device 200. For example, when the communication module is the Bluetooth communication module, the communication address of the external device 200 may include a Bluetooth communication address of the external device 200.

In operation 935, the communication module may establish a communication connection with the external device 200 using device identification information received from the processor 150. For example, the communication module may establish a Bluetooth communication connection with the Bluetooth communication module of the external device 200 using the Bluetooth communication address of the external device 200 received from the processor 150.

In operation 940, after the communication connection is established, the communication module of the electronic device 100 may receive, from the external device 200, audio content including audio information, which is content to be shared.

In operation 945, the audio content received through the communication module may be transmitted to the audio outputter 130 under the control of the processor 150.

In operation 950, the audio information received through the communication module may be transmitted to the partially withdrawn rollable display 110 under the control of the processor 150.

In operation 955, the audio outputter 130 may output the received audio content, and in operation 960, the fully withdrawn rollable display 110 may output (e.g., display, present) the video content.

Figure 10:
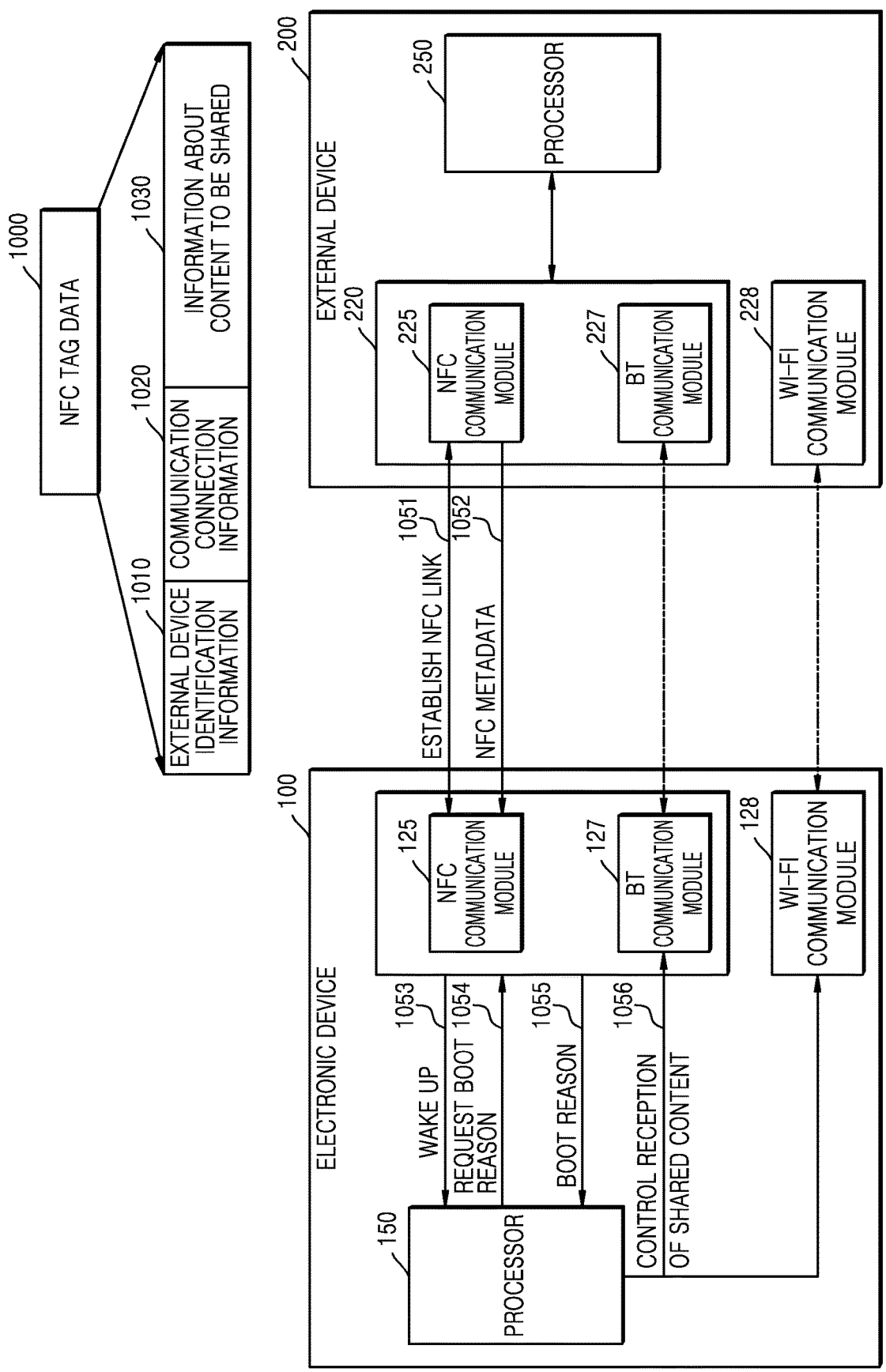
FIG. 10 is a reference diagram for describing an example in which an electronic device processes a tagging input using a near field communication (NFC) communication module, according to an embodiment.

FIG. 10 is a reference diagram for describing an example in which an electronic device 100 processes a tagging input using an NFC communication module, according to an embodiment.

According to an embodiment, each of the electronic device 100 and the external device 200 may include an NFC communication module and may process a tagging input using the NFC communication module. The NFC communication module 125 of the electronic device 100 and the NFC communication module 225 of the external device 200 may establish an NFC link by an operation of bringing the external device 200 in close proximity to and/or in contact with the electronic device 100. The electronic device 100 may detect a tagging input from the external device 200 by the NFC link established as described above.

Referring to FIG. 10, the NFC communication module 225 of the external device 200 and the NFC communication module 125 of the electronic device 100 may establish an NFC link by an operation of bringing the external device 200 in close proximity to and/or in contact with the electronic device 100 (operation 1051).

The NFC communication module 125 of the electronic device 100 operating as an NFC reader may read NFC tag data 1000 in an NFC data exchange format (NDEF) from the NFC communication module 225 of the external device 200 through the established NFC link (operation 1052).

The NFC tag data 1000 may include external device identification information 1010, communication connection information 1020, and information about content to be shared 1030.

The external device identification information 1010 may include information to identify the external device 200.

The communication connection information 1020 may include address information used to connect communication with the external device 200. For example, the communication connection information 1020 may include a Bluetooth communication ID for Bluetooth communication, a Wi-Fi direct communication ID for Wi-Fi direct communication, or a communication ID for other communications.

The information about content to be shared 1030 may include various types of information to specify content to be shared. For example, the information about content to be shared 1030 may include at least one of content identification information, a content file name, identification information of an application used to execute the content, and the like.

The NFC communication module 125 may obtain the external device identification information 1010, the communication connection information 1020, and the information about content to be shared 1030 from the received NFC tag data 1000.

According to an embodiment, the NFC communication module 125 may perform, according to the tagging input, an operation of waking up the processor 150 by transmitting a wake-up signal to the processor 150 in a sleep state to perform an operation corresponding to the tagging input (operation 1053).

The processor 150 that has received the wake-up signal may be woken up from the sleep state and request a boot reason to the NFC communication module 125 to identify the cause of the wake-up (operation 1054).

The NFC communication module 125 that has received the request for the boot reason from the processor 150 may provide the boot reason to the processor 150 based on information included in the NFC tag data 1000 (operation 1055). The boot reason may include, for example, external device identification information, communication connection information, and information about content to be shared. The boot reason may further include, for example, information indicating an operation that the processor 150 needs to perform. The operation that the processor 150 needs to perform may include, for example, information indicating an operation of receiving and outputting the shared content from the external device 200.

The processor 150 that has received the boot reason may determine the content output mode based on information about the content to be shared and may control the rollable display 110 to be withdrawn and control an operation of the audio outputter 130 according to the determined content output mode. The operation according to the content output mode is the same as described above with reference to FIGS. 6 to 9.

The processor 150 may control a communication module used to receive the content to be shared. For example, the processor 150 may control a suitable communication module to receive the shared content in consideration of a bandwidth of the content to be shared or the like (operation 1056).

According to an embodiment, when the content to be shared is audio content, the processor 150 may control the Bluetooth communication module to receive the audio content from the external device 200. For example, the processor 150 may provide a Bluetooth communication ID of the external device 200 to the Bluetooth communication module 127 in the communication connection information among the information included in the boot reason, and the Bluetooth communication module 127 may receive the audio content from the external device 200 by performing pairing and connecting communications with the external device 200 using the Bluetooth communication ID of the external device 200.

In an embodiment, when the content to be shared is audio/video content, the processor 150 may control the Wi-Fi communication module to receive audio/video content from the external device 200. For example, the processor 150 may provide a Wi-Fi Direct communication ID of the external device 200 to the Wi-Fi communication module 128 in the communication connection information among the information included in the boot reason, and the Wi-Fi communication module 128 may receive the audio/video content from the external device 200 by performing pairing and connecting communications with the external device 200 using the Wi-Fi Direct communication ID of the external device 200.

Figure 11:
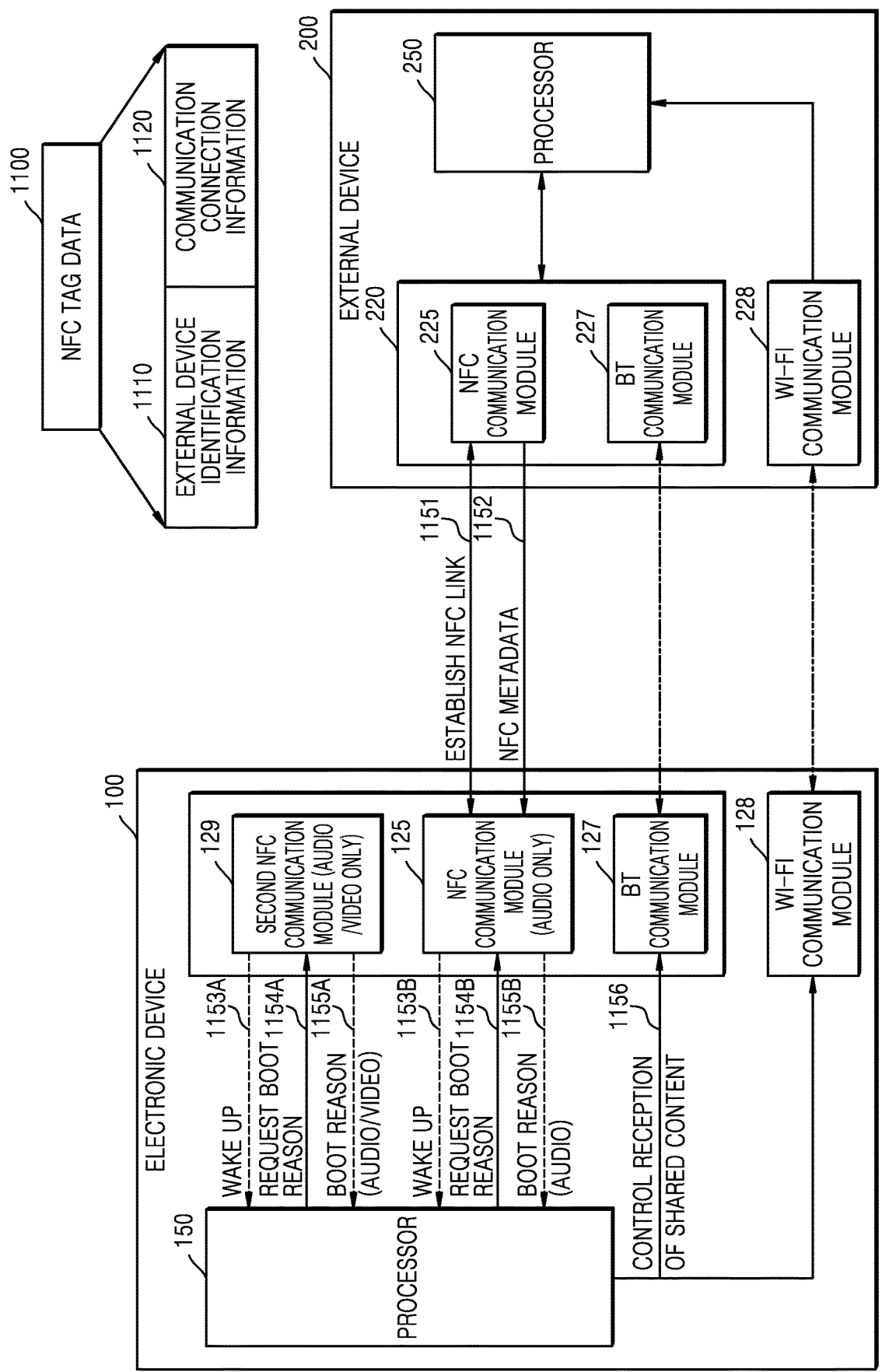
FIG. 11 is a reference diagram for describing an example in which an electronic device processes a tagging input using a plurality of NFC communication modules, according to an embodiment.

FIG. 11 is a reference diagram for describing an example in which an electronic device 100 processes a tagging input using a plurality of NFC communication modules, according to an embodiment.

According to an embodiment, each of the electronic device 100 and the external device 200 may include an NFC communication module and may process a tagging input using the NFC communication module. The NFC communication module 125 of the electronic device 100 and the NFC communication module 225 of the external device 200 may establish an NFC link by an operation of bringing the external device 200 in close proximity to and/or in contact with the electronic device 100. The electronic device 100 may detect a tagging input from the external device 200 by the NFC link established as described above. The example illustrated in FIG. 11 is different from the example illustrated in FIG. 10 in that, in the case of FIG. 11, the electronic device 100 includes a plurality of NFC communication modules and the external device 200 determines the type of content to be shared according to which NFC communication module among the plurality of NFC communication modules the tagging input is performed. For example, the electronic device 100 may include a first NFC communication module 125 and a second NFC communication module 129 at positions spaced apart from each other. For example, when the external device 200 has performed a tagging input with respect to the first NFC communication module 125, the electronic device 100 may determine that the content to be shared is audio content. Alternatively or additionally, when the external device 200 has performed a tagging input with respect to the second NFC communication module 129, the external device 200 may determine that the content to be shared is audio/video content. As described above, because the type of the content is determined according to the position of the tagging input using the plurality of NFC communication modules, there may be no need to provide information about the content to NFC metadata in the example illustrated in FIG. 11.

Referring to FIG. 11, the electronic device 100 may further include a second NFC communication module 129 in addition to the first NFC communication module 125. The NFC communication module 225 of the external device 200 and the NFC communication module 125 of the electronic device 100 may establish an NFC link by an operation of bringing the external device 200 in close proximity to and/or in contact with the electronic device 100 (operation 1151).

The first NFC communication module 125 of the electronic device 100 operating as an NFC reader may receive NFC tag data from the NFC communication module 225 of the external device 200 through the established NFC link (operation 1152).

NFC tag data 1100, as illustrated in FIG. 11, may include external device identification information 1110 and communication connection information 1120. Unlike the NFC tag data 1000 described in reference to FIG. 10, the NFC tag data 1100 may not include information about content to be shared.

The external device identification information 1110 may include information to identify the external device 200.

The communication connection information 1120 may include address information used to connect communication with the external device 200. For example, the communication connection information 1120 may include a Bluetooth communication ID for Bluetooth communication, a Wi-Fi direct communication ID for Wi-Fi direct communication, or a communication ID for other communications.

The first NFC communication module 125 may obtain the external device identification information 1110 and the communication connection information 1120 from the received NFC tag data 1100.

According to an embodiment, the first NFC communication module 125 and/or the second NFC communication module 129 may perform, according to the tagging input, an operation of waking up the processor 150 by transmitting a wake-up signal to the processor 150 in a sleep state to perform an operation corresponding to the tagging input (operations 1153A and 1153B).

The processor 150 that has received the wake-up signal may be woken up from the sleep state and request a boot reason from the first NFC communication module 125 and/or the second NFC communication module 129 to identify the cause of the wake-up (operations 1154A and 1154B).

The first NFC communication module 125 and/or the second NFC communication module 129 that has received the request for the boot reason from the processor 150 may provide the boot reason to the processor 150 based on information included in NFC tag data 1100 (operations 1155A and 1155B). The boot reason may include, for example, external device identification information, communication connection information, and content type information. In this case, the content type information may not be information obtained from the NFC tag 1100 but may be information determined by the first NFC communication module 125 and/or the second NFC communication module 129. For example, the first NFC communication module 125, as a module corresponding to audio content, may determine that reception of a tagging input by the first NFC communication module 125 indicates that the user intends to share audio content, and thus, the first NFC communication module 125 may indicate "audio content" as "content type information" in the boot reason. For another example, the second NFC communication module 129, as a module corresponding to audio/video content, may determine that receiving a tagging input by the second NFC communication module 129 indicates that the user intends to share audio/video content, and thus, the second NFC communication module 129 may indicate "audio/video content" as "content type information" in the boot reason. The boot reason may further include, for example, information indicating an operation that the processor 150 needs to perform. The operation that the processor 150 needs to perform may include, for example, information indicating an operation of receiving and outputting the shared content from the external device 200.

The processor 150 that has received the boot reason may determine the content output mode based on information about the content to be shared and may control the rollable display 110 to be withdrawn and control an operation of the audio outputter 130 according to the determined content output mode. The operation according to the content output mode is the same as described above with reference to FIGS. 6 to 9.

The processor 150 may control a communication module used to receive the content to be shared. For example, the processor 150 may control a suitable communication module to receive the shared content in consideration of a bandwidth of the content to be shared or the like (operation 1156).

According to an embodiment, when the content to be shared is audio content, the processor 150 may control the Bluetooth communication module to receive the audio content from the external device 200. For example, the processor 150 may provide a Bluetooth communication ID of the external device 200 to the Bluetooth communication module 127 in the communication connection information among the information included in the boot reason, and the Bluetooth communication module 127 may receive the audio content from the external device 200 by performing pairing and connecting communications with the external device 200 using the Bluetooth communication ID of the external device 200.

For example, when the content to be shared is audio/video content, the processor 150 may control the Wi-Fi communication module to receive audio/video content from the external device 200. For example, the processor 150 may provide a Wi-Fi Direct communication ID of the external device 200 to the Wi-Fi communication module 128 in the communication connection information among the information included in the boot reason, and the Wi-Fi communication module 128 may receive the audio/video content from the external device 200 by performing pairing and connecting communications with the external device 200 using the Wi-Fi Direct communication ID of the external device 200.

Figure 12:
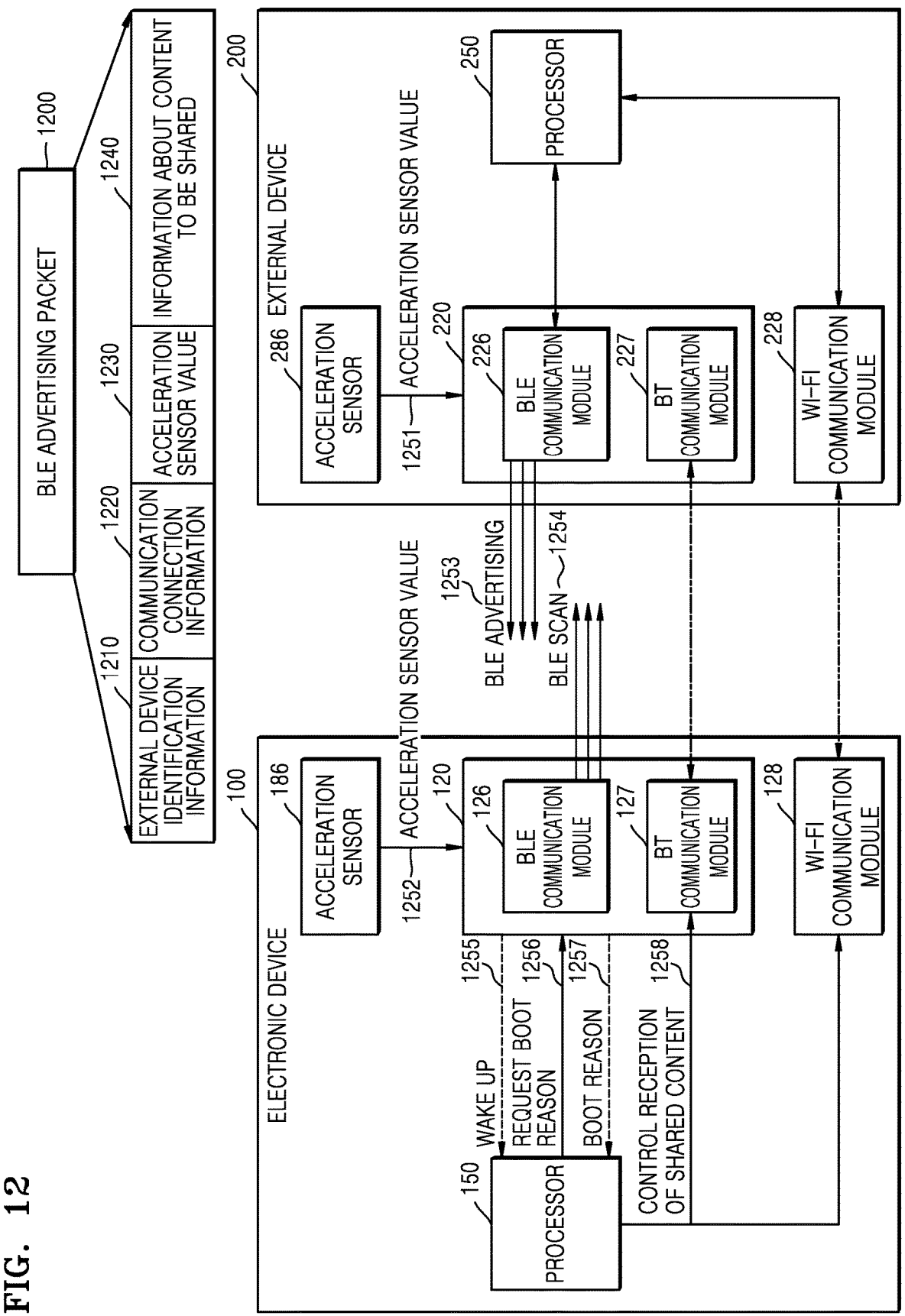
FIG. 12 is a reference diagram for describing an example in which an electronic device processes a tagging input using an acceleration sensor, according to an embodiment.

FIG. 12 is a reference diagram for describing an example in which an electronic device 100 processes a tagging input using an acceleration sensor, according to an embodiment.

According to an embodiment, each of the electronic device 100 and the external device 200 may include an acceleration sensor and may process a tagging input using the acceleration sensor. An acceleration sensor 186 of the electronic device 100 and an acceleration sensor 286 of the external device 200 may detect an acceleration sensor value by an operation of bringing the external device 200 in contact with the electronic device 100. The electronic device 100 may detect the tagging input from the external device 200 based on an acceleration sensor value detected by the electronic device 100 and an acceleration sensor value received by the external device 200.

Referring to FIG. 12, the acceleration sensor 286 of the external device 200 may detect an acceleration sensor value by an operation of the external device 200 contacting and/or touching the electronic device 100 and may provide the detected acceleration sensor value to the BLE communication module 226 (operation 1251).

When there is a contact from the external device 200, the acceleration sensor 186 of the electronic device 100 in a low-power mode state may also detect an acceleration sensor value by impact or pressure due to the contact, and the acceleration sensor 186 may provide the detected acceleration sensor value to the BLE communication module 126 (operation 1252).

The BLE communication module 226 that has received the acceleration sensor value from the external device 200 may broadcast a BLE advertising packet 1200 according to a predetermined rule (operation 1253). The BLE advertising packet 1200 may comprise a data payload section capable of transmitting a predetermined amount of data (e.g., up to 31 bytes of data). The BLE communication module 226 may include data according to the predetermined rule in the BLE advertising packet 1200 and broadcast the BLE advertising packet 1200. According to an embodiment, the BLE communication module 226 that has received the acceleration sensor value may generate a BLE advertising packet 1200.

The BLE advertising packet 1200 may include external device identification information 1210, communication connection information 1220, an acceleration sensor value 1230, and information about content to be shared 1240.

The external device identification information 1210 may include information to identify the external device 200.

The communication connection information 1220 may include address information used to connect communication with the external device 200. For example, the communication connection information 1220 may include a Bluetooth communication ID for Bluetooth communication, a Wi-Fi direct communication ID for Wi-Fi direct communication, or a communication ID for other communication.

The acceleration sensor value 1230 may include an acceleration sensor value received from the acceleration sensor 286.

The information about content to be shared 1240 may include various types of information to specify content to be shared. For example, the information about content to be shared 1240 may include at least one of content identification information, a content file name, identification information of an application used to execute the content, and the like.

When the acceleration sensor 186 provides the acceleration sensor value to the BLE communication module 126, the BLE communication module 126 may scan for and receive (e.g., recognize) the BLE advertising broadcast from the external device 200 by performing BLE scanning (operation 1254).

The BLE communication module 126 may parse the recognized BLE advertising packet 1200 and obtain the external device identification information 1210, the communication connection information 1220, the acceleration sensor value 1230, and the information about content to be shared 1240.

According to an embodiment, the BLE communication module 126 may compare the acceleration sensor value 1230 included in the BLE advertising packet 1200 with the acceleration sensor value of the electronic device 100 received from the acceleration sensor 186. As a result of the comparison, when a difference between the acceleration sensor value received from the external device 200 and the acceleration sensor value of the electronic device 100 is less than a threshold, the BLE communication module 126 may identify that there is a tagging input from the external device 200 that has transmitted the corresponding acceleration sensor value.

According to an embodiment, the BLE communication module 126 may perform an operation of waking up the processor 150 by transmitting a wake-up signal to the processor 150 in the sleep state to perform an operation corresponding to the tagging input, according to the tagging input identified using an acceleration sensor value (operation 1255).

The processor 150 that has received the wake-up signal may be woken up from the sleep state and may request a boot reason to the BLE communication module 126 to identify the cause of the wake-up (operation 1256).

The BLE communication module 126 that has received the request for the boot reason from the processor 150 may provide the boot reason to the processor 150 based on information included in the BLE advertising packet 1200 (operation 1257). The boot reason may include, for example, external device identification information, communication connection information, and information about content to be shared. The boot reason may further include, for example, information indicating an operation that the processor 150 needs to perform. The operation that the processor 150 needs to perform may include, for example, information indicating an operation of receiving and outputting the shared content from the external device 200.

The processor 150 that has received the boot reason may determine the content output mode based on information about the content to be shared and may control the rollable display 110 to be withdrawn and control an operation of the audio outputter 130 according to the determined content output mode. The operation according to the content output mode is the same as described above with reference to FIGS. 6 to 9.

The processor 150 may control a communication module used to receive the content to be shared. For example, the processor 150 may control a suitable communication module to receive the shared content in consideration of a bandwidth of the content to be shared or the like (operation 1258).

According to an embodiment, when the content to be shared is audio content, the processor 150 may control the Bluetooth communication module to receive the audio content from the external device 200. For example, the processor 150 may provide a Bluetooth communication ID of the external device 200 to the Bluetooth communication module 127 in the communication connection information among the information included in the boot reason, and the Bluetooth communication module 127 may receive the audio content from the external device 200 by performing pairing and connecting communications with the external device 200 using the Bluetooth communication ID of the external device 200.

For example, when the content to be shared is audio/video content, the processor 150 may control the Wi-Fi communication module to receive audio/video content from the external device 200. For example, the processor 150 may provide a Wi-Fi Direct communication ID of the external device 200 to the Wi-Fi communication module 128 in the communication connection information among the information included in the boot reason, and the Wi-Fi communication module 128 may receive the audio/video content from the external device 200 by performing pairing and connecting communications with the external device 200 using the Wi-Fi Direct communication ID of the external device 200.

According to an embodiment, the electronic device 100 may receive the tagging input using wireless tagging.

The wireless tagging is a technology that determines proximity between devices through wireless communication without a particular tag device, generates a tag event, and provides a service according to the occurrence of the tag event. The wireless tagging determines proximity between two devices using a radio signal according to various wireless communication technologies, for example, a radio signal such as a Wi-Fi signal or a Bluetooth signal, generates a tag event in response to the determining of the proximity, and when the tag event occurs, operates a service according to the tag event. The wireless tagging determines proximity between two devices using a signal strength of a radio signal, and because the signal strength of the radio signal varies according to the proximity between the two devices, the signal strength value of the radio signal may be used to determine whether a tagging input has been received. The radio signal received from the external device 200 may be a radio signal according to various wireless communication technologies, and may include, for example, a Bluetooth signal according to Bluetooth communication technology or a Wi-Fi signal according to Wi-Fi communication technology.

Figure 13:
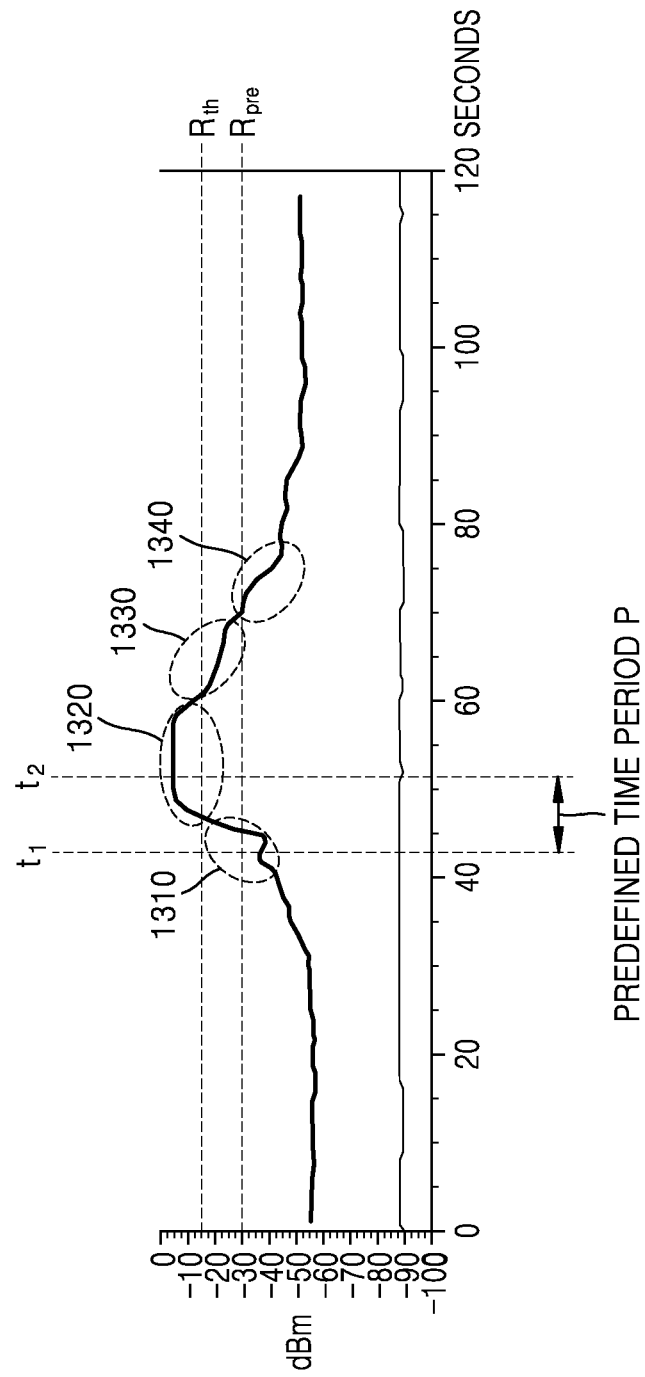
FIG. 13 illustrates a strength of a radio signal changed by a tagging operation that brings two devices close to and then away from each other, according to an embodiment.

FIG. 13 illustrates a signal strength of a radio signal changed by a tagging operation that brings two devices in close proximity to each other and then away from each other, according to an embodiment.

Referring to FIG. 13, when a Bluetooth external device or a Wi-Fi external device is in close proximity to the electronic device 100, the signal strength of a radio signal of the external device 200 increases, and when separation occurs, the radio signal is attenuated again. Referring to FIG. 13, a first duration 1310 indicates a duration in which the signal strength of the radio signal increases as the external device 200 approaches the electronic device 100, a second duration 1320 indicates a duration in which the strength of the radio signal is highest because the external device 200 is closest to the electronic device 100, and a third duration 1330 and a fourth duration 1340 indicate durations in which the strength of the radio signal is attenuated as the external device 200 moves away from the electronic device 100. A signal strength pattern similar to that of FIG. 13 is typically exhibited by a wireless tagging operation in which the user brings the external device 200 in close proximity to the electronic device 100 and then away from the electronic device 100.

FIG. 14 is a reference diagram for describing an example of processing a tagging input using wireless tagging in an electronic device 100, according to an embodiment.

Referring to FIG. 14, the BLE communication module 226 of the external device 200 may broadcast BLE advertising according to a predetermined rule by an operation of bringing the external device 200 in close proximity to the electronic device 100 and then away from the electronic device 100 (operation 1451).

The BLE communication module 226 may include data according to the predetermined rule in a BLE advertising packet 1400 and broadcast the BLE advertising packet 1400.

The BLE advertising packet 1400 may include external device identification information 1410, communication connection information 1420, signal strength information 1430, and information about content to be shared 1440.

The external device identification information 1410 may include information to identify the external device 200.

The communication connection information 1420 may include address information used to connect communication with the external device 200. For example, the communication connection information 1420 may include a Bluetooth communication ID for Bluetooth communication, a Wi-Fi direct communication ID for Wi-Fi direct communication, or a communication ID for other communication.

The signal strength information 1430 may include at least one of transmission power information and a received signal strength indicator (RSSI).

The information about content to be shared 1440 may include various types of information to specify content to be shared. For example, the information about content to be shared 1440 may include content identification information, a content file name, identification information of an application used to execute the content, or the like.

In the electronic device 100 in a low-power mode state, the BLE communication module 126 may recognize the BLE advertising broadcast from the external device 200 by performing BLE scanning (operation 1452).

The BLE communication module 126 may parse the recognized BLE advertising packet 1400 and obtain the external device identification information 1410, the communication connection information 1420, the signal strength information 1430, and the information about content to be shared 1440.

According to an embodiment, the BLE communication module 126 may identify that there is a tagging input from the external device 200 based on the signal strength information 1430 included in the BLE advertising packet 1400.

According to an embodiment, the BLE communication module 126 may identify that there is a tagging input by monitoring the signal strength information 1430, that is included in the BLE advertising packet 1400, having a predetermined signal strength pattern and determining whether the signal strength information 1430 corresponds to the predetermined signal strength pattern. The predetermined signal strength pattern corresponding to an operation of bringing the external device 200 in close proximity to and then away from the electronic device 100. For example, the predetermined signal strength pattern may include one or more signal strength threshold values and/or one or more duration threshold values of the radio signal. For example, the predetermined signal strength pattern may include two signal strength threshold values and two duration threshold values of the radio signal. That is, the predetermined signal strength pattern may include a first signal strength threshold value at a first time point, a second signal strength threshold value at a second time point, a first threshold value of a duration corresponding to the first time point, and a second threshold value of a duration corresponding to the second time point. According to an embodiment, the BLE communication module 126 may determine two parameters (e.g., $R_{th}$ and $R_{pre}$) as parameters for determining the signal strength of a signal in the signal diagram as illustrated in FIG. 13. $R_{th}$ is a first threshold parameter that the signal strength of the received radio signal is to exceed (e.g., be greater than or equal to), and $R_{pre}$ is a second threshold parameter that the signal strength of the received radio signal needs to be less than. For example, $R_{pre}$ denotes a second threshold parameter that the signal strength of the received radio signal needs to be less than, at a time point $t_1$ prior to a predefined time period P from a time point $t_2$ at which the signal strength of the received radio signal exceeds a value of the first threshold parameter $R_{th}$. That is, the BLE communication module 126 may identify a time point $t_2$ at which the signal strength of the received radio signal is greater than $R_{th}$, and when the signal strength of the received radio signal at a time point $t_1$ prior to a predefined time period P from the time point $t_2$ is less than $R_{pre}$, the BLE communication module 126 may determine that a tagging input has been generated with respect to the received radio signal. In this case, the BLE communication module 126 may determine whether the tagging input has been generated based on the parameters that are a criterion for generation of the tagging input, such as, the first threshold parameter $R_{th}$ and the second threshold parameter $R_{pre}$.

Referring to FIG. 14, according to an embodiment, the BLE communication module 126 may perform an operation of waking up the processor 150 by transmitting a wake-up signal to the processor 150 in the sleep state to perform an operation corresponding to the tagging input, according to the tagging input identified using the signal strength information of the radio signal (operation 1453).

The processor 150 that has received the wake-up signal may be woken up from the sleep state and may request a boot reason to the BLE communication module 126 to identify the cause of the wake-up (operation 1454).

The BLE communication module 126 that has received the request for the boot reason from the processor 150 may provide the boot reason to the processor 150 based on information included in the BLE advertising packet 1400 (operation 1455). The boot reason may include, for example, external device identification information, communication connection information, and information about content to be shared. The boot reason may further include, for example, information indicating an operation that the processor 150 needs to perform. The operation that the processor 150 needs to perform may include, for example, information indicating an operation of receiving and outputting the shared content from the external device 200.

The processor 150 that has received the boot reason may determine the content output mode based on information about the content to be shared and may control the rollable display 110 to be withdrawn and control an operation of the audio outputter 130 according to the determined content output mode. The operation according to the content output mode is the same as described above with reference to FIGS. 6 to 9.

The processor 150 may control a communication module used to receive the content to be shared. For example, the processor 150 may control a suitable communication module to receive the shared content in consideration of a bandwidth of the content to be shared or the like (operation 1456).

According to an embodiment, when the content to be shared is audio content, the processor 150 may control the Bluetooth communication module to receive the audio content from the external device 200. For example, the processor 150 may provide a Bluetooth communication ID of the external device 200 to the Bluetooth communication module 127 in the communication connection information among the information included in the boot reason, and the Bluetooth communication module 127 may receive the audio content from the external device 200 by performing pairing and connecting communications with the external device 200 using the Bluetooth communication ID of the external device 200.

For example, when the content to be shared is audio/video content, the processor 150 may control the Wi-Fi communication module to receive audio/video content from the external device 200. For example, the processor 150 may provide a Wi-Fi Direct communication ID of the external device 200 to the Wi-Fi communication module 128 in the communication connection information among the information included in the boot reason, and the Wi-Fi communication module 128 may receive the audio/video content from the external device 200 by performing pairing and connecting communications with the external device 200 using the Wi-Fi Direct communication ID of the external device 200.

In the example illustrated in FIG. 14, the BLE communication module is exemplified as a module for processing the tagging input, but a module for processing the tagging input using the signal strength of the radio signal may use a Wi-Fi radio signal using a Wi-Fi communication module.

Some embodiments of the disclosure may be implemented as a computer-readable recording medium, e.g., a program module to be executed in computers, which includes computer-readable instructions. The computer-readable recording medium may be any available medium which is accessible by a computer, and may include a volatile or non-volatile medium and a detachable or non-detachable medium. The computer-readable recording medium may also include a computer storage medium. The computer storage medium includes both volatile and non-volatile, detachable or non-detachable media implemented using any method or technique for storing information such as computer-readable instructions, data structures, program modules or other data.

The embodiments of the disclosure may be implemented in a software (S/W) program including instructions stored in a computer-readable storage medium.

The computer may be a device capable of calling the stored instructions from the storage medium and operating according to the embodiments disclosed herein, based on the called instructions, and may include an electronic device 100 according to the embodiments of the disclosure.

The computer-readable storage mediums may be provided in the form of non-transitory storage mediums. Here, the term "non-transitory" simply means that the storage medium is tangible and does not refer to a transitory electrical signal, but does not distinguish that data is stored semi-permanently or temporarily in the storage medium.

Control methods according to the embodiments disclosed herein may be provided in computer program products. The computer program products may be traded as commodities between sellers and buyers.

The computer program products may include S/W programs or computer-readable storage media storing the S/W programs. For example, the computer program products may include S/W program-type products (e.g., downloadable applications) that are electronically distributed through manufacturers of electronic devices or electronic markets (e.g., Google™ Play Store or App Store). For electronic distribution, at least a part of the S/W programs may be stored in storage media or may be temporarily generated. In this case, the storage media may be storage media of servers of manufacturers, servers of electronic markets, or relay servers that temporarily store the S/W programs.

The computer program product may include a storage medium of a server or a storage medium of an electronic device in a system which includes the server and the electronic device. Alternatively, when there is a third device (e.g., a smart phone) that communicates with the server or the electronic device, the computer program product may include a storage medium of the third device. Alternatively, the computer program product may include an S/W program itself that is transmitted from the server to the electronic device or the third device, or transmitted from the third device to the electronic device.

In this case, one of the server, the electronic device, and the third device may perform the method according to the disclosed embodiments by executing the computer program product. Alternatively, two or more of the server, the electronic device, and the third device may perform the method according to the disclosed embodiments in a distributed manner by executing the computer program product.

For example, the server (e.g., a cloud server, an artificial intelligence server, or the like) may execute the computer program product stored in the server, thereby controlling the electronic device to perform the method according to the disclosed embodiments, the electronic device communicating with the server.

In another example, the third device may execute the computer program product, thereby controlling the electronic device to perform the method according to the disclosed embodiments, the electronic device communicating with the third device. When the third device executes the computer program product, the third device may download the computer program product from the server, and may execute the downloaded computer program product. Alternatively, the third device may perform the method according to the disclosed embodiments by executing a pre-loaded computer program product.

In addition, in the specification, the term "unit" may be a hardware component such as a processor or a circuit, and/or a software component executed by a hardware component such as a processor.

Those of ordinary skill in the art to which the disclosure pertains will appreciate that the disclosure may be implemented in different detailed ways without departing from the technical spirit or essential characteristics of the disclosure. Hence, it should be understood that the embodiments of the disclosure described above are not limiting of the scope of the disclosure. For example, each element described in a single type may be executed in a distributed manner, and elements described distributed may also be executed in an integrated form.

The scope of the disclosure is not defined by the detailed description of the disclosure but by the following claims, and all modifications or alternatives derived from the scope and spirit of the claims and equivalents thereof fall within the scope of the disclosure.

The invention claimed is:

1. An electronic device comprising:
an audio outputter;
a rollable display;
a communicator configured to:
receive a tagging input from an external device, when the electronic device is in a low-power mode state, and
obtain information about content to be received from the external device according to the tagging input; and
a processor configured to control output of the content received from the external device when the processor is woken up by the communicator, wherein the processor is further configured to:
determine, based on the information about the content, a content output mode indicating a degree to which the rollable display is to be withdrawn, and
control at least one of the rollable display or the audio outputter to output the content received from the external device, according to the content output mode.

2. The electronic device of claim 1, wherein the information about the content includes at least one of content identification information or identification information of an application used to execute the content, and
the processor is further configured to determine the content output mode based on the at least one of the content identification information or the identification information of the application.

3. The electronic device of claim 1, wherein the processor is further configured to:
identify, based on the information about the content, a type of the content as one of audio content, audio content including audio information, or audio/video content, and
determine the content output mode based on the identified type of the content.

4. The electronic device of claim 3, wherein the processor is further configured to:
based on the identified type of the content being the audio content, determine the content output mode as a closed mode in which the audio content is output without controlling the rollable display to be withdrawn, and
based on determining the content output mode as the closed mode, control the audio outputter to output the audio content received from the external device without controlling the rollable display to be withdrawn.

5. The electronic device of claim 3, wherein the processor is further configured to:
based on the identified type of the content being the audio content including the audio information, determine the content output mode as a partial withdrawal mode in which the audio content is output in a state in which the rollable display is partially withdrawn, and
based on determining the content output mode as the partial withdrawal mode:
control the rollable display to be partially withdrawn,
control the rollable display to output the audio information on the partially withdrawn rollable display, and
control the audio outputter to output the received audio content.

6. The electronic device of claim 3, wherein the processor is further configured to:
based on the identified type of the content being the audio/video content, determine the content output mode as a full withdrawal mode in which the audio/video content is output in a state in which the rollable display is fully withdrawn, and
based on determining of the content output mode as the full withdrawal mode:
control the rollable display to be fully withdrawn and output video content among the audio/video content received from the external device, and
control the audio outputter to output the audio content among the audio/video content.

7. The electronic device of claim 6, wherein the processor is further configured to control the rollable display so that a first aspect ratio of the withdrawn rollable display corresponds to a second aspect ratio of the video content.

8. The electronic device of claim 1, wherein the communicator is further configured to:
based on receiving the tagging input, wake up the processor, and
provide, to the processor that is woken up, a boot reason including the information about the content.

9. The electronic device of claim 1, wherein the communicator is further configured to receive the tagging input from the external device through at least one of a near field communication (NFC) communication module or a Bluetooth Low Energy (BLE) communication module.

10. The electronic device of claim 1, wherein the communicator comprises a near field communication (NFC) communication module configured to:
obtain, through the tagging input received from the external device, identification information of the external device and the information about the content to be received from the external device,
wake up the processor according to the tagging input, and
provide, to the processor that is woken up, the identification information of the external device and the information about the content.

11. The electronic device of claim 1, wherein the communicator comprises a plurality of near field communication (NFC) communication modules,
an NFC communication module, among the plurality of NFC communication modules, that has received the tagging input from the external device, is configured to:
obtain, through the tagging input received from the external device, identification information of the external device and the information about the content to be received from the external device, and
wake up the processor according to the tagging input, and provide, to the processor that is woken up, the identification information of the external device and the information about the content, and the processor is further configured to identify a type of the content to be received from the external device by identifying the NFC communication module, among the plurality of NFC communication modules, that has woken up the processor.

12. The electronic device of claim 1, wherein the communicator comprises a Bluetooth Low Energy (BLE) communication module is configured to:
receive the tagging input based on a signal strength of a signal received from the external device,
obtain, through the tagging input, identification information of the external device and the information about the content to be received from the external device,
wake up the processor according to the tagging input, and
provide, to the processor that is woken up, the identification information of the external device and the information about the content.

13. The electronic device of claim 1, wherein the communicator comprises a Bluetooth Low Energy (BLE) communication module is configured to:
receive the tagging input based on an acceleration sensor value of the external device,
obtain, through the tagging input, identification information of the external device and the information about the content to be received from the external device,
wake up the processor according to the tagging input, and
provide, to the processor that is woken up, the identification information of the external device and the information about the content.

14. The external device of claim 3, wherein the processor is further configured to:
based on the identified type of the content being the audio content, control the communicator to receive the audio content through Bluetooth communication, and
based on the identified type of the content being the audio/video content, control the communicator to receive the audio/video content through Wireless Fidelity (Wi-Fi) communication.

15. A method of operating an electronic device comprising a rollable display, an audio outputter, a communicator, and a processor, the method comprising:
receiving, by the communicator, a tagging input from an external device, in a low-power mode state of the electronic device;
obtaining information about content to be received from the external device according to the tagging input;
determining, by the processor woken up by the communicator, a content output mode indicating a degree to which the rollable display is to be withdrawn according to the information about the content obtained from the communicator; and
outputting the content received from the external device through at least one of the rollable display or the audio outputter, according to the content output mode.

16. The method of claim 15, wherein the receiving of the tagging input from the external device, in the low-power mode state of the electronic device, comprises:

receiving, by the communicator in an active state when the electronic device is in the low-power mode state, the tagging input from the external device using at least one of near field communication (NFC) tagging technology, wireless tagging technology using an acceleration sensor, and wireless tagging technology using radio signal strength information.

17. An electronic device comprising:
an audio outputter configured to output audio content;
a rollable display configured to withdraw from a housing module;
a memory storing instructions; and
at least one processor communicatively coupled to the audio outputter, the rollable display, and the memory, wherein the at least one processor is configured to execute the instructions to:
transition from a low power mode state to an active state, in response to receiving, from an external device, a tagging input based on signal strength information received from the external device;
obtain, according to the tagging input, content information of to-be-shared content from the external device;
determine, based on the content information, a type of the to-be-shared content and a content output mode;
identify, based on the type of the to-be-shared content, at least one communication module of the electronic device to receive the to-be-shared content from the external device;
withdraw the rollable display to a position corresponding to the content output mode;
receive, via the at least one communication module from the external device, the to-be-shared content as received content; and
output, according to the content output mode, the received content using at least one of the rollable display and the audio outputter.

18. The electronic device of claim 17, wherein the content information of the to-be-shared content from the external device comprises at least one of content identification information of the to-be-shared content and application identification information of an application used to execute the to-be-shared content.

19. The electronic device of claim 17, wherein a first communication module of the at least one communication module is configured to:
monitor the signal strength information received from the external device; and
identify the tagging input based on a predetermined signal strength pattern, the predetermined signal strength pattern corresponding to a tagging input operation.

20. The electronic device of claim 19, wherein the predetermined signal strength pattern includes at least one signal strength threshold value and at least one duration threshold value of a radio signal.

* * * * *